(12) United States Patent
Aronov et al.

(10) Patent No.: US 12,360,044 B2
(45) Date of Patent: Jul. 15, 2025

(54) METHOD FOR IDENTIFYING STRESSORS IN AN AGRICULTURAL ENVIRONMENT BASED ON CHARACTERISTICS OF MICROBE SENSORS

(71) Applicant: InnerPlant, Inc., San Francisco, CA (US)

(72) Inventors: Shely Aronov, San Francisco, CA (US); Ari Kornfeld, San Francisco, CA (US); Roderick Kumimoto, San Francisco, CA (US)

(73) Assignee: InnerPlant, Inc., Davis, CA (US)

( * ) Notice: Subject to any disclaimer, the term of this patent is extended or adjusted under 35 U.S.C. 154(b) by 305 days.

(21) Appl. No.: 17/991,199

(22) Filed: Nov. 21, 2022

(65) Prior Publication Data

US 2023/0160828 A1 May 25, 2023

Related U.S. Application Data

(63) Continuation-in-part of application No. 17/846,808, filed on Jun. 22, 2022, now abandoned, which is a
(Continued)

(51) Int. Cl.
*G01N 21/64* (2006.01)
*A01G 25/16* (2006.01)
(Continued)

(52) U.S. Cl.
CPC ......... *G01N 21/6486* (2013.01); *A01G 25/16* (2013.01); *G01N 21/6456* (2013.01);
(Continued)

(58) Field of Classification Search
CPC ........... G01N 21/6486; G01N 21/6456; G01N 2021/635; G01N 2021/8466; A01G 25/16;
(Continued)

(56) References Cited

U.S. PATENT DOCUMENTS

| 7,715,013 B2* | 5/2010 | Glaser ................ G01N 21/4738 356/448 |
| 9,563,945 B2* | 2/2017 | Fryshman ................ G06T 3/40 |

(Continued)

FOREIGN PATENT DOCUMENTS

| CN | 102721651 A | 10/2012 |
| CN | 104614321 A | 5/2015 |

(Continued)

OTHER PUBLICATIONS

Liew et al. "Signature Optical Cues: Emerging Technologies for Monitoring Plant Health" Sensors 2008, 8, 3205-3239; DOI: 10.3390/s8053205 (See IDS dated Jul. 14, 2023) (Year: 2008).*

(Continued)

*Primary Examiner* — Richard A Hansell, Jr.
(74) *Attorney, Agent, or Firm* — Finnegan, Henderson, Farabow, Garrett & Dunner, LLP

(57) ABSTRACT

One variation of a method includes accessing an image of a plant canopy in an environment inhabited by: a population of microbe sensors of a microbe type including a microbe promoter-reporter pair configured to generate microbe-reporter signals representing presence of a stressor in the environment; and a set of sensor plants of a sensor plant type including a plant promoter-reporter pair configured to signal presence of microbe-reporter signals at the set of sensor plants. The method further includes: accessing a reporter model linking features extracted from images of sensor plants of the sensor plant type to pressures of the set of stressors based on plant-reporter signals generated by the plant promoter-reporter pair and microbe types of microbe sensors inhabiting the environment; and interpreting a pressure of the stressor in the environment based on the reporter model, the microbe type, and features extracted from the image.

5 Claims, 11 Drawing Sheets

Related U.S. Application Data continuation of application No. 17/680,978, filed on Feb. 25, 2022, which is a continuation of application No. 17/479,965, filed on Sep. 20, 2021, now Pat. No. 11,366,063, which is a continuation of application No. 16/721,830, filed on Dec. 19, 2019, now Pat. No. 11,808,705.

(60) Provisional application No. 63/281,260, filed on Nov. 19, 2021, provisional application No. 63/281,264, filed on Nov. 19, 2021, provisional application No. 62/894,676, filed on Aug. 30, 2019, provisional application No. 62/864,401, filed on Jun. 20, 2019, provisional application No. 62/782,130, filed on Dec. 19, 2018.

(51) Int. Cl.
| | |
|---|---|
| *B64D 47/08* | (2006.01) |
| *B64G 1/10* | (2006.01) |
| *G06T 7/00* | (2017.01) |
| *G06V 10/22* | (2022.01) |

(52) U.S. Cl.
CPC .......... *G06T 7/0012* (2013.01); *G06V 10/225* (2022.01); *B64D 47/08* (2013.01); *B64G 1/1021* (2013.01); *B64G 1/1028* (2023.08)

(58) Field of Classification Search
CPC ....... A01G 7/00; G06T 7/0012; G06T 7/0002; G06T 2207/30188; G06T 2207/10036; G06V 10/225; G06V 20/188; B64D 47/08; B64G 1/1021; B64G 1/1028; A01M 1/026
See application file for complete search history.

(56) References Cited

U.S. PATENT DOCUMENTS

| | | | |
|---|---|---|---|
| 9,945,828 B1 | 4/2018 | Poling et al. | |
| 10,354,189 B2* | 7/2019 | Volkov | G06N 5/04 |
| 10,986,827 B2 | 4/2021 | Aronov et al. | |
| 11,557,118 B2* | 1/2023 | Ding | G06F 9/3891 |
| 2003/0023386 A1 | 1/2003 | Aranibar et al. | |
| 2003/0138812 A1* | 7/2003 | Downs | G01N 33/50 435/5 |
| 2005/0072935 A1* | 4/2005 | Lussier | G01N 21/6486 250/458.1 |
| 2005/0136445 A1* | 6/2005 | Yang | C12Q 1/6897 435/6.18 |
| 2006/0160108 A1 | 7/2006 | Romanov et al. | |
| 2006/0183137 A1 | 8/2006 | Harper et al. | |
| 2008/0047039 A1 | 2/2008 | Hinchey | |
| 2009/0026815 A1 | 1/2009 | Amesar et al. | |
| 2009/0044287 A1 | 2/2009 | Bughrara | |
| 2010/0111369 A1 | 5/2010 | Lussier | |
| 2012/0245473 A1* | 9/2012 | Mycek | G01N 21/474 600/479 |
| 2013/0266221 A1* | 10/2013 | Kaneko | G06T 5/00 382/168 |
| 2014/0007293 A1 | 1/2014 | Stewart et al. | |
| 2014/0051101 A1 | 2/2014 | Dinneny | |
| 2014/0059722 A1 | 2/2014 | Krichevsky | |
| 2015/0027040 A1 | 1/2015 | Redden | |
| 2016/0069743 A1 | 3/2016 | McQuilkin et al. | |
| 2017/0030877 A1* | 2/2017 | Miresmailli | A01M 21/043 |
| 2017/0044505 A1* | 2/2017 | Krichevsky | C12N 15/8242 |
| 2017/0121733 A1 | 5/2017 | Repetti et al. | |
| 2017/0131254 A1 | 5/2017 | Shriver et al. | |
| 2017/0223947 A1* | 8/2017 | Gall | G01N 21/4738 |
| 2018/0259496 A1 | 9/2018 | McPeek | |
| 2019/0003972 A1* | 1/2019 | Gu | G01N 21/6486 |
| 2019/0108413 A1 | 4/2019 | Chen et al. | |
| 2020/0019765 A1* | 1/2020 | Ampatzidis | H04N 23/90 |
| 2020/0302338 A1* | 9/2020 | Carroll | G06N 20/10 |
| 2021/0204521 A1* | 7/2021 | Hamaekers | G06T 7/11 |
| 2022/0151215 A1 | 5/2022 | Aronov et al. | |

FOREIGN PATENT DOCUMENTS

| | | |
|---|---|---|
| CN | 105473998 A | 4/2016 |
| CN | 106086057 A | 11/2016 |
| CN | 106796145 A | 5/2017 |
| CN | 109788748 A | 5/2019 |
| WO | 9840008 A1 | 9/1998 |
| WO | 0049161 A1 | 8/2000 |
| WO | 2007082359 A1 | 7/2007 |
| WO | 2020068694 A1 | 4/2020 |

OTHER PUBLICATIONS

Priego et al. "Detection of Water Stress in Orchard Trees With a High-Resolution Spectrometer Through Chlorophyll Fluorescence In-Filling of the O2-A Band", IEEE Transactions on Geoscience and Remote Sensing, vol. 43, No. 12, Dec. 2005 (See IDS dated Jul. 14, 2023) (Year: 2005).*
Fethe M. H. "The performance of bacterial phytosensing transgenic tobacco under field conditions", Masters Thesis, University of Tennessee, Knoxville, Dec. 2013 (See IDS dated Jul. 14, 2023) (Year: 2013).*
Grützner et.al "Engineering Betalain Biosynthesis in Tomato for High Level Betanin Production in Fruits", Frontiers in Plant Science, (2022) vol. 12.
Amy Lowe et al, "Hyperspectral image analysis techniques for the detection and classification of the early onset of plant disease and stress", Plant Methods, GB, (Dec. 1, 2017), vol. 13, No. 1.
Band et al. "Root gravitropism is regulated by a transient lateral auxin gradient controlled by a tipping-point mechanism." Proceedings of the National Academy of Sciences 109.12 (2012): 4668-4673 [online].
Chinese Office action received in CN App. No. 20198009562.4 dated Dec. 21, 2021.
ESSR received in EP Application No. 19900184.3 dated Sep. 2, 2022.
Fethe, "The Performance of Bacterial Phytosensing Transgenic Tobacco Under Field Conditions" (2013), Master's Thesis, University of Tennessee[online].
Final Office Action for U.S. Appl. No. 17/479,965 dated Jan. 31, 2022.
Harris et al., Betalain production is possible in anthocyaninproducingplant species given the presence ofDOPA-dioxygenase and L-DOPA, (2012), 12:34.
International Search Report dated Jun. 10, 2020 received in PCT/US19/67674—All references cited in this report have been cited in U.S. Appl. No. 16/721,830 in an Information Disclosure Statement filed on Jul. 10, 2020.
International Search Report dated Sep. 4, 2020 received in PCT/US20/39001.
International Search Report Received in PCT/US20/39001 dated Sep. 4, 2020.
Kim Song-Lim et al, "Data management for plant phenomics", Journal of Plant Biology, Botanical Society of Korea, Seoul, KR, vol. 60, No. 4, doi:10.1007/S12374-017-0027-X, ISSN 1226-9239, (Aug. 8, 2017), pp. 285-297.
Liew et al. "Signature Optical Cues: Emerging Technologies for Monitoring Plant Health" Sensors 2008, 8, 3205-3239; DOI: 10.3390/s8053205 (Year: 2008).
Newton A C et al, "Relationship between canopy reflectance and yield loss due to disease in barley", Annals of Applied Biology, Association of Applied Biologists, Wellesbourne, GB, (Mar. 16, 2005), vol. 145, No. 1.
Non-Final Office Action for U.S. Appl. No. 17/217,840 dated Sep. 21, 2022.
Notice of Allowance received in U.S. Appl. No. 16/908,526 dated Apr. 29, 2021.

(56) References Cited

OTHER PUBLICATIONS

Office Action dated Nov. 24, 2021 received in U.S. Appl. No. 17/479,965.
Office Action received in Chinese Patent Application No. 202080054171.6 dated Jun. 5, 2022.
Office Action received in U.S. Appl. No. 17/680,978 dated Mar. 30, 2023.
Pasquale Tripodi et al, "Sensing Technologies for Precision Phenotyping in Vegetable Crops: Current Status and Future Challenges", Agronomy, (Apr. 22, 2018), vol. 8, No. 4.
Priego et al. "Detection of Water Stress in Orchard Trees With a High-Resolution Spectrometer Through Chlorophyll Fluorescence In-Filling of the 02-A Band", IEEE Transactions on Geoscience and Remote Sensing, vol. 43, No. 12, Dec. 2005 (Year: 2005).

* cited by examiner

METHOD FOR IDENTIFYING STRESSORS IN AN AGRICULTURAL ENVIRONMENT BASED ON CHARACTERISTICS OF MICROBE SENSORS

CROSS-REFERENCE TO RELATED APPLICATIONS

This application claims the benefit of U.S. Provisional Application No. 63/281,260, filed on 19 Nov. 2021, and U.S. Provisional Application No. 63/281,264, filed on 19 Nov. 2021, both of which are incorporated in their entireties by this reference.

This application is a continuation-in-part of U.S. patent application Ser. No. 17/846,808, filed on 22 Jun. 2022, which is a continuation of U.S. patent application Ser. No. 17/680,978, filed on 25 Feb. 2022, which is a continuation of U.S. patent application Ser. No. 17/479,965, filed on 20 Sep. 2021, which is a continuation of U.S. patent application Ser. No. 16/721,830, filed on 19 Dec. 2019, which claims the benefit of U.S. Provisional Application No. 62/894,676, filed on 30 Aug. 2019, U.S. Provisional Application No. 62/864,401, filed on 20 Jun. 2019, and U.S. Provisional Application No. 62/782,130, filed on 19 Dec. 2018, each of which are incorporated in its entirety by this reference.

TECHNICAL FIELD

This invention relates generally to the field of agriculture and more specifically to a new and useful system and method for identifying stressors in an agricultural field based on characteristics of microbe sensors in the field of agriculture.

DESCRIPTION OF THE EMBODIMENTS

Figure 1A:
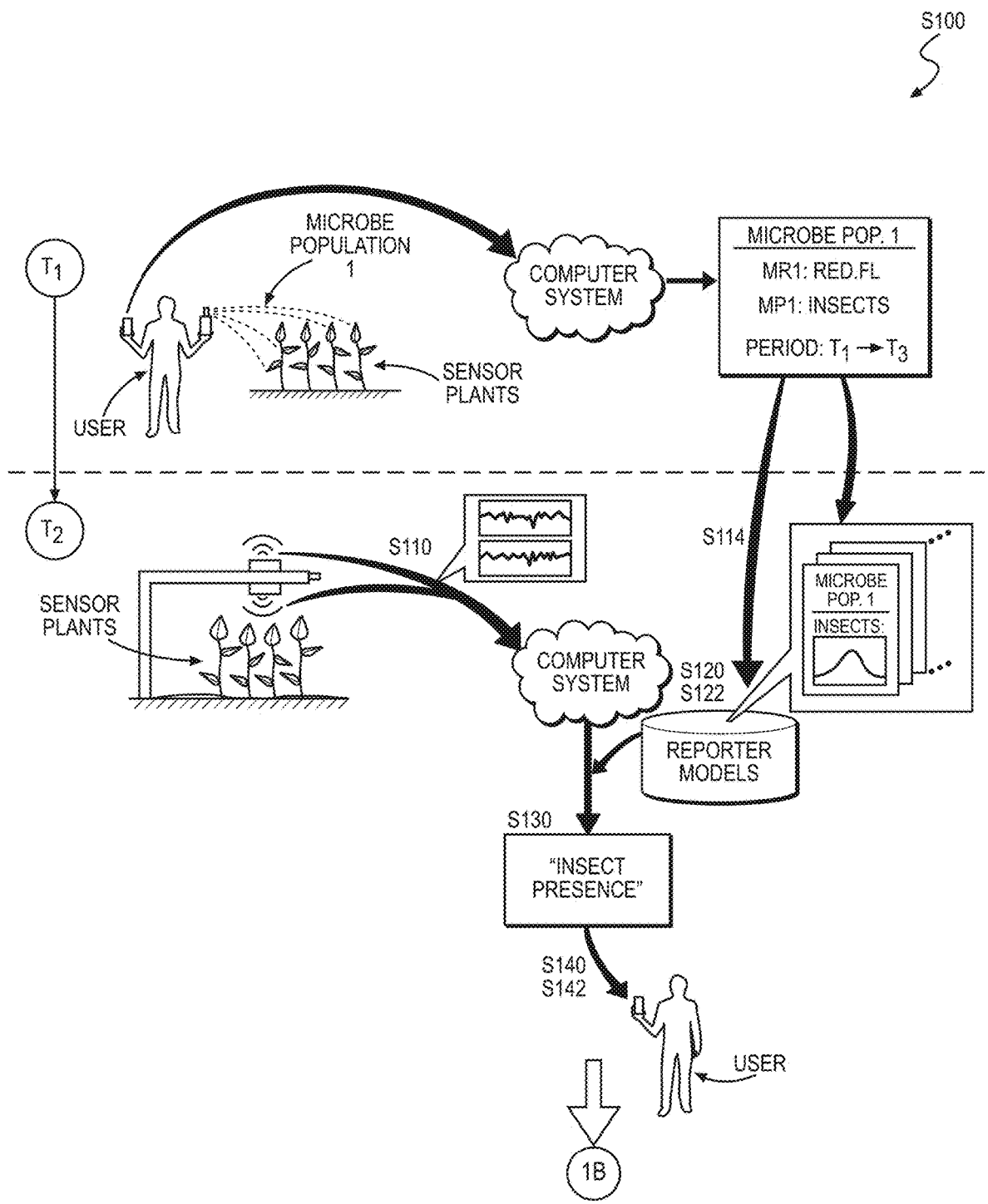
FIGS. 1A and 1B are flowchart representations of a method.
Figure 1B:
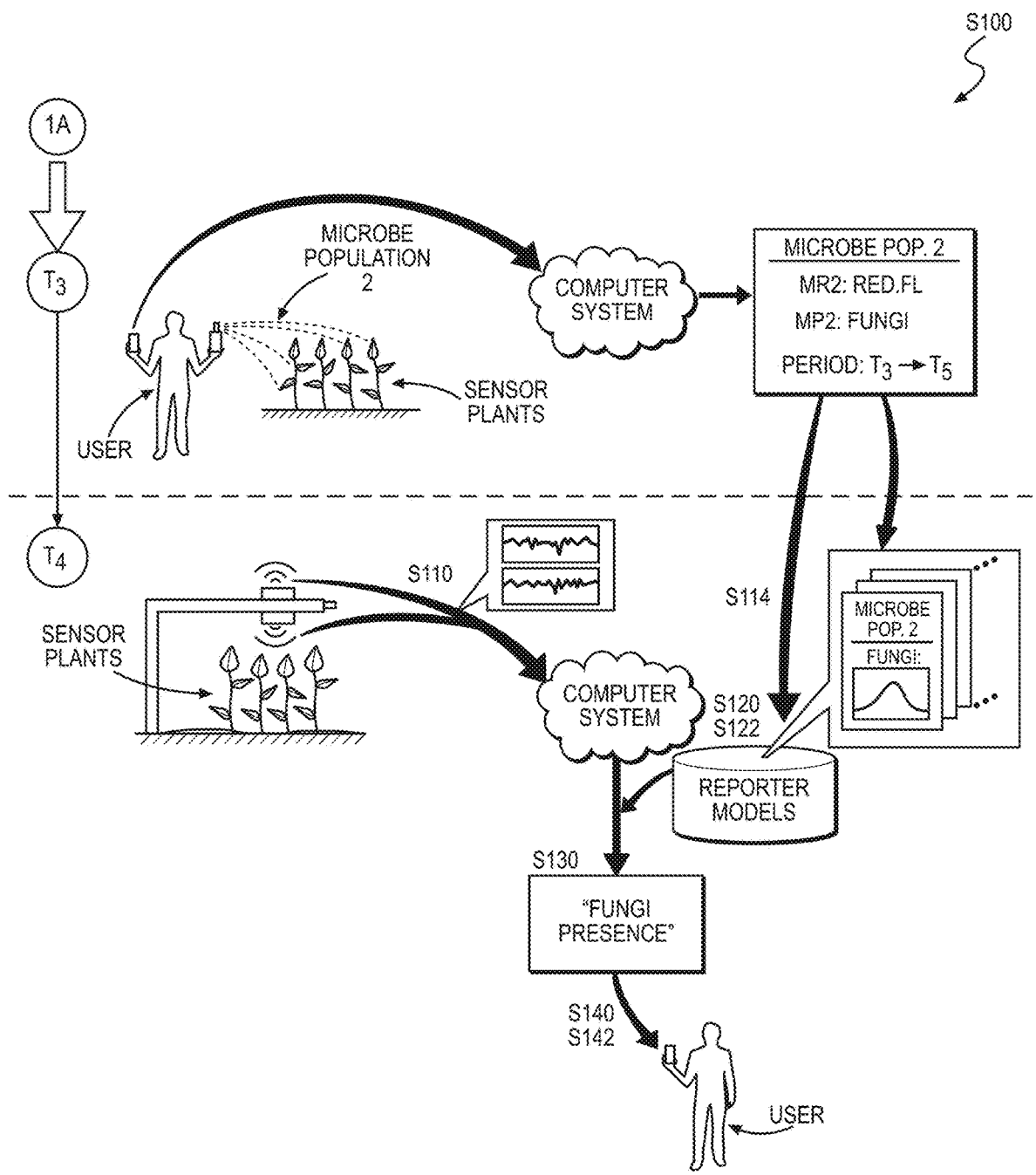
Figure 2A:
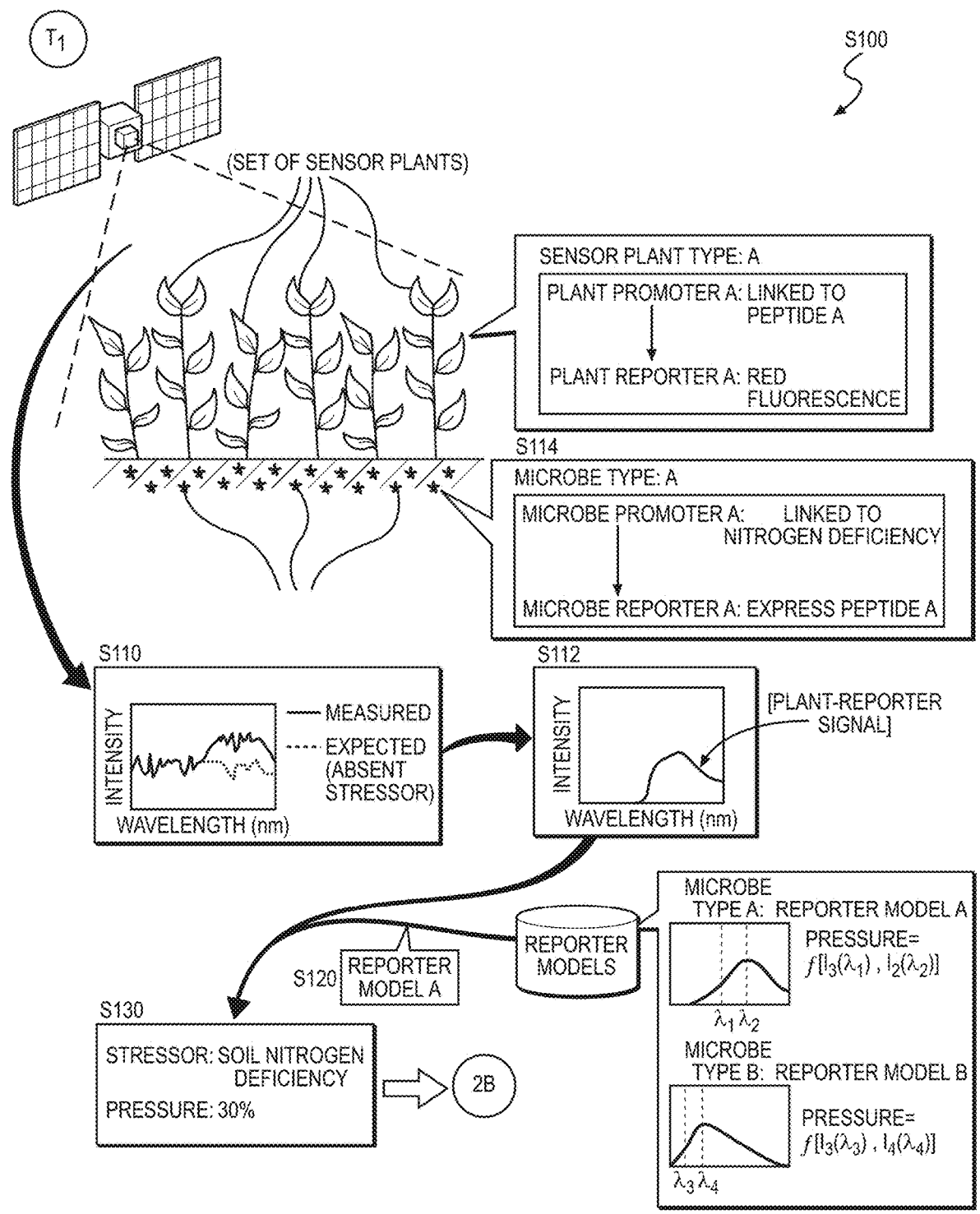
FIGS. 2A and 2B are flowchart representations of one variation of the method.
Figure 2B:
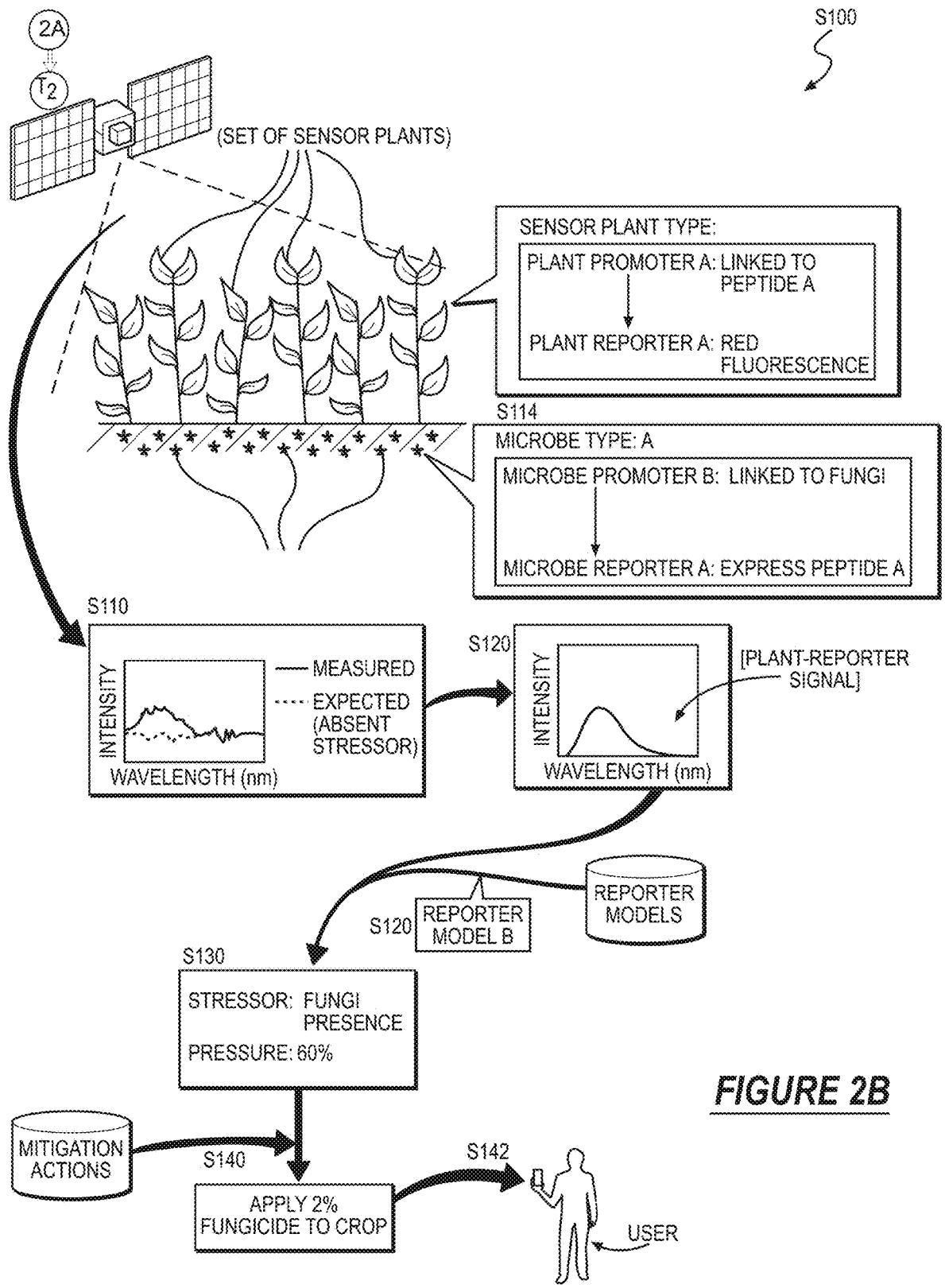
Figure 3:
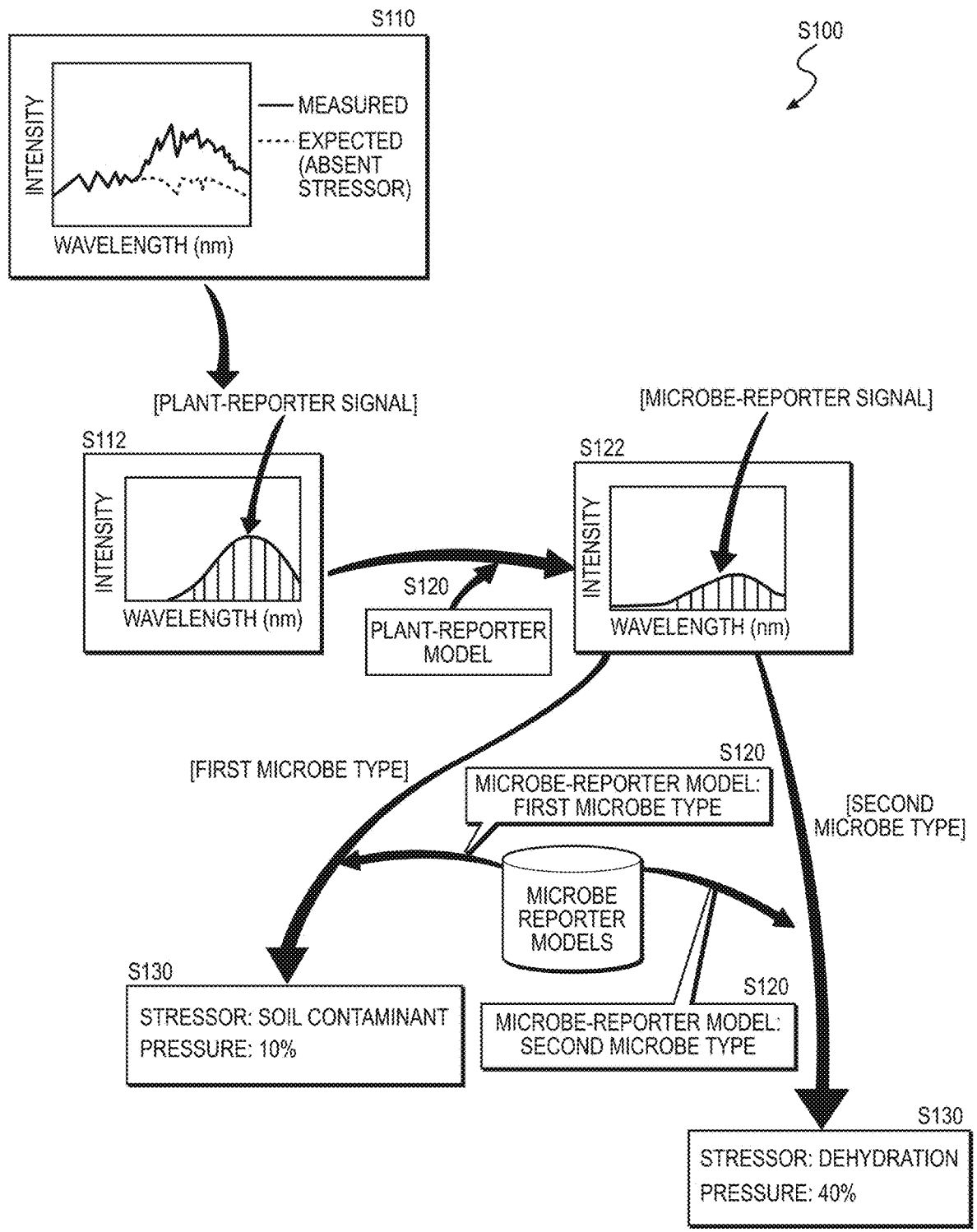
FIG. 3 is a flowchart representation of one variation of the method.
Figure 4A:
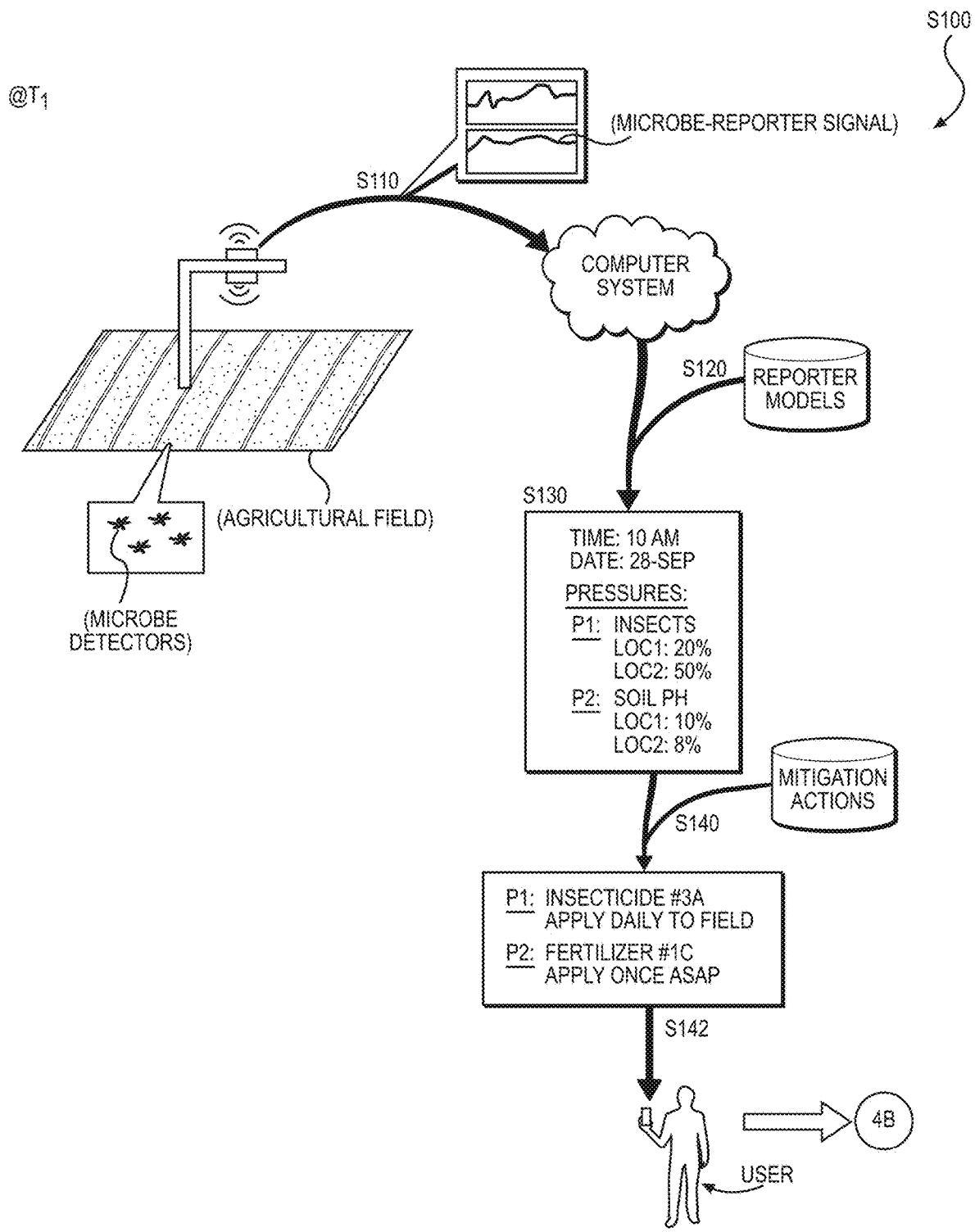
FIGS. 4A, 4B, and 4C are flowchart representations of one variation of the method.
Figure 4B:
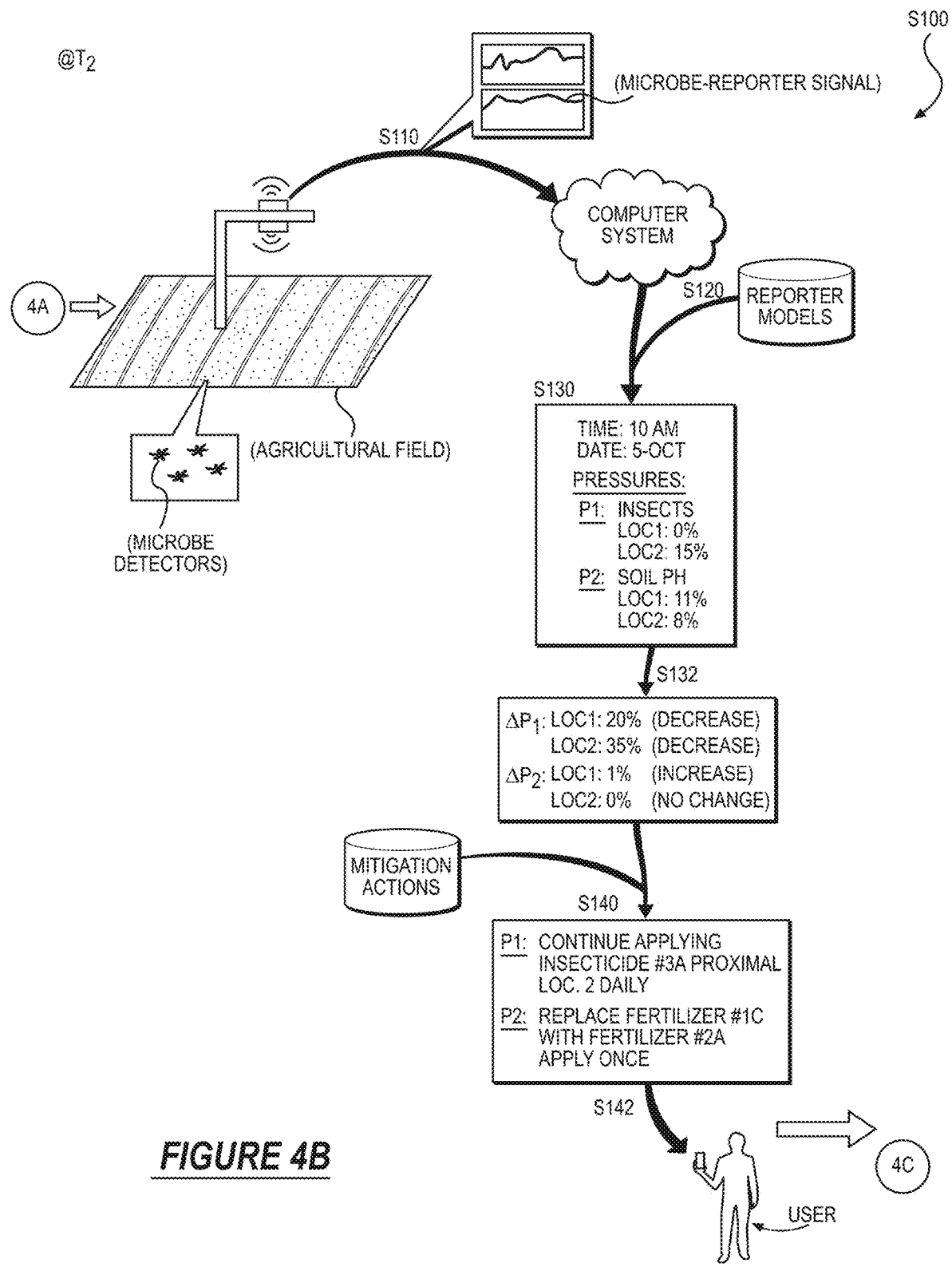
Figure 4C:
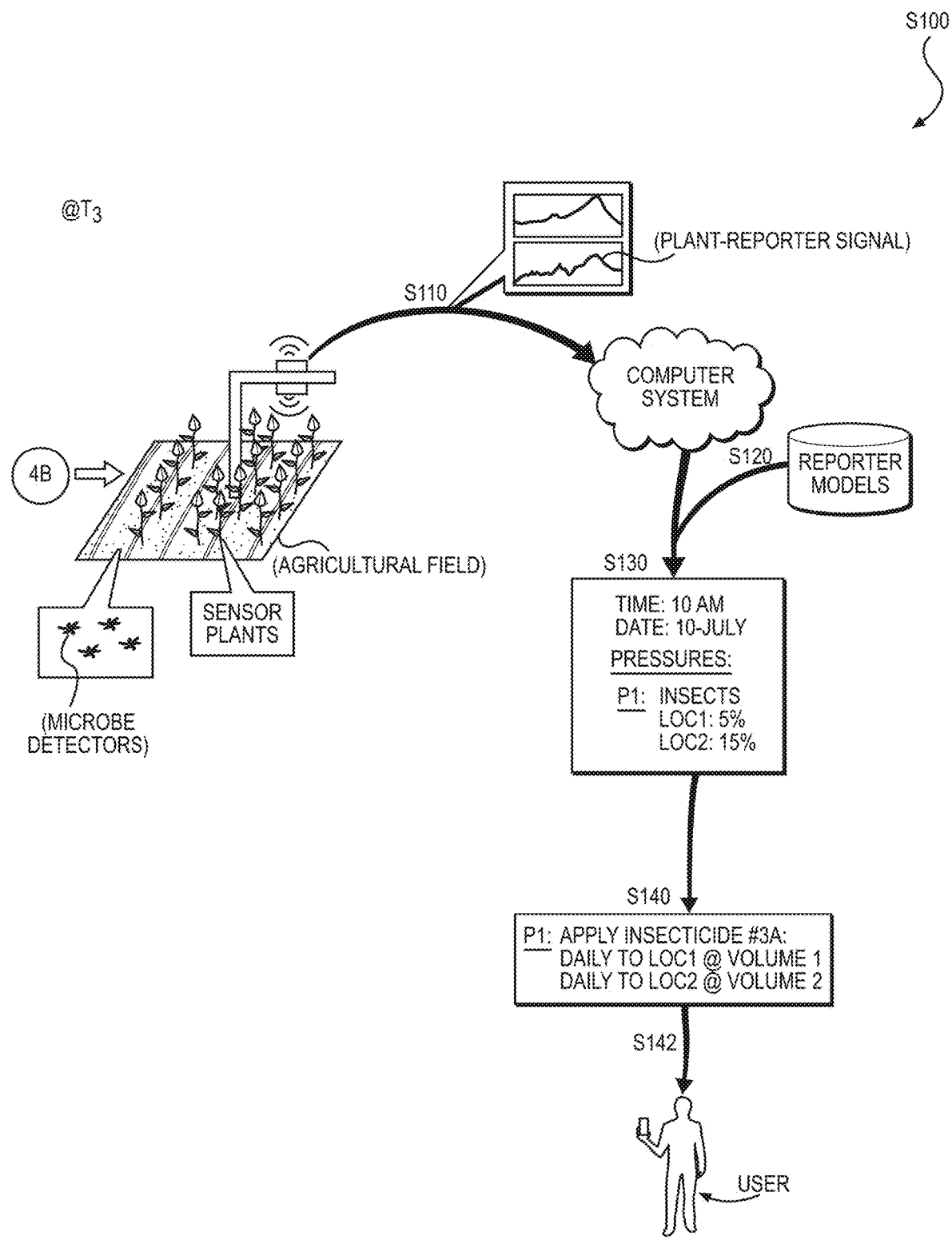
Figure 5A:
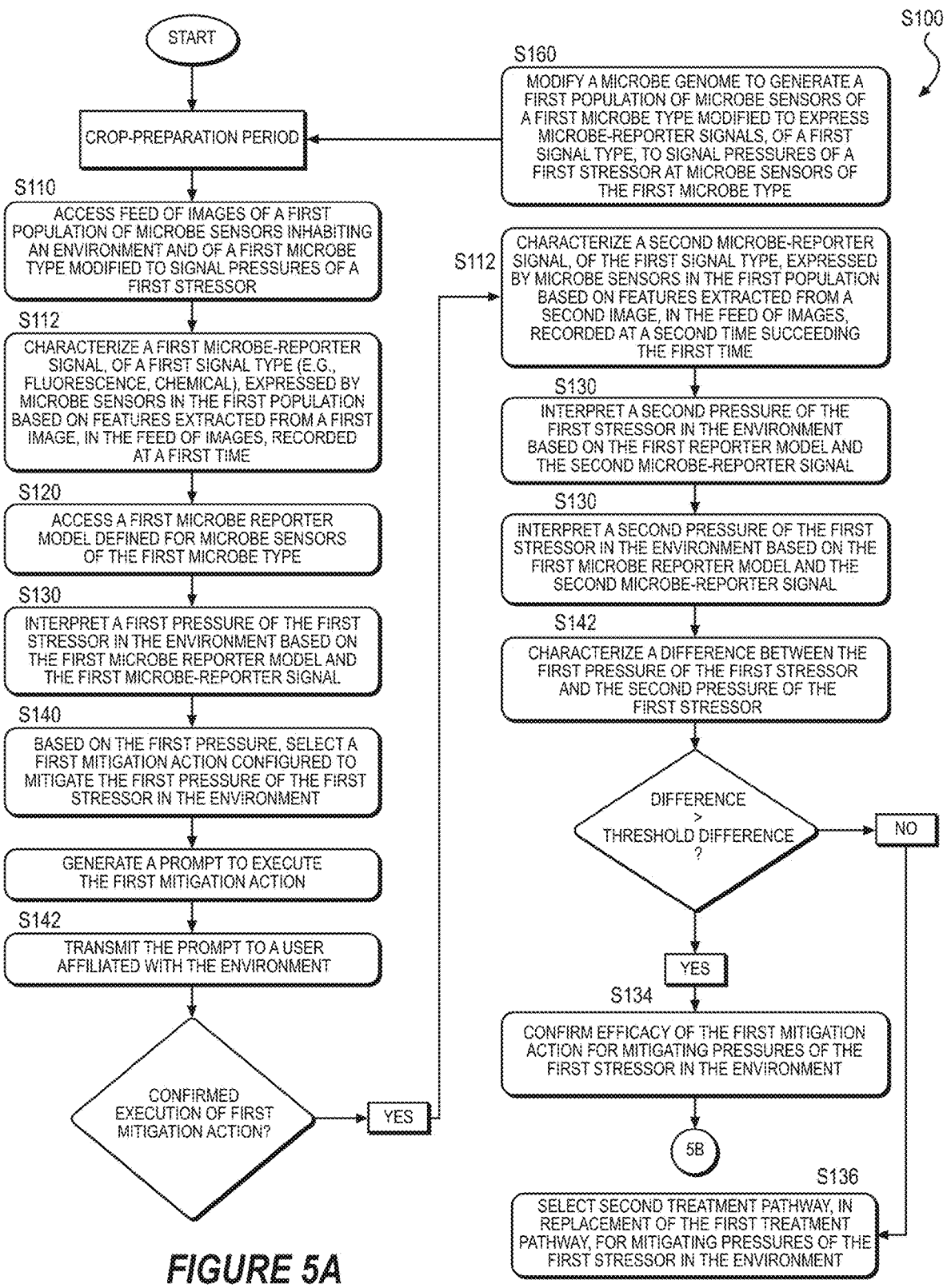
FIGS. 5A and 5B are flowchart representations of one variation of the method.
Figure 5B:
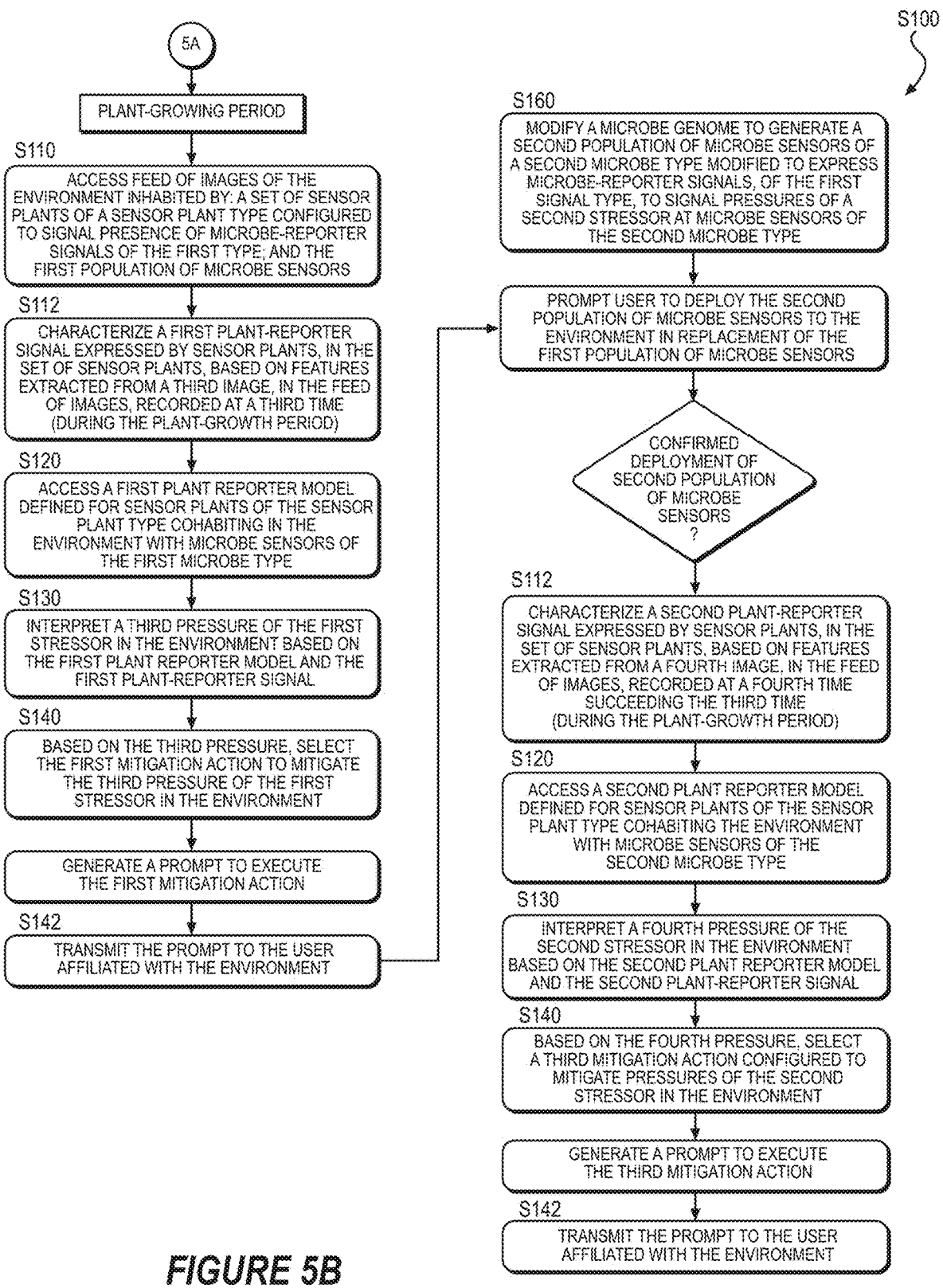

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

As shown in FIGS. 1A, 1B, 2A, 2B, 3, 4A-4C, 5A, 5B, and 6, a method S100 includes, during a first time period: accessing a first image of a set of sensor plants inhabiting a region of an agricultural environment and of a sensor plant type configured to signal detection of microbe-reporter signals, of a first signal type, expressed by microbe sensors inhabiting the region of the agricultural environment, the first image captured at a first time during the first time period in Block S110; characterizing a first plant-reporter signal expressed by sensor plants, in the set of sensor plants, based on features extracted from the first image in Block S112; and accessing a microbe type of a first population of microbe sensors present in the region of the agricultural environment during the first time period in Block S114. The method S100 further includes, during the first time period, in response to the microbe type corresponding to a first microbe type, microbe sensors of the first microbe type configured to generate microbe-reporter signals of the first signal type responsive to pressures of a first stressor, in a set of stressors, at microbe sensors of the first microbe type: accessing a first reporter model, in a set of reporter models, linking plant-reporter signals, expressed by sensor plants of the sensor plant type, to pressures of the set of stressors in regions inhabited by microbe sensors of the first microbe type in Block S120; and, based on the first reporter model and the first plant-reporter signal, interpreting a first pressure of the first stressor in the agricultural environment in Block S130.

During a second time period succeeding the first time period, the method S100 further includes: accessing a second image of the set of sensor plants recorded at a second time during the second time period in Block S110; characterizing a second plant-reporter signal expressed by sensor plants, in the set of sensor plants, based on features extracted from the second image in Block S112; and accessing the microbe type of a second population of microbe sensors present in the agricultural environment during the second time period in Block S114. The method S100 further includes, during the second time period, in response to the microbe type corresponding to a second microbe type, microbe sensors of the second microbe type configured to generate microbe-reporter signals of the first signal type responsive to pressures of a second stressor, in the set of stressors, at microbe sensors of the second microbe type: accessing a second reporter model, in the set of reporter models, linking plant-reporter signals, expressed by sensor plants of the sensor plant type, to pressures of the set of stressors in regions inhabited by microbe sensors of the second microbe type in Block S120; and, based on the second reporter model and the second plant-reporter signal, interpreting a second pressure of the second stressor in the agricultural environment in Block S130.

In one variation, the method S100 further includes: during an initial time period preceding the first time period, genetically-modifying the first population of microbe sensors to include a first microbe promoter-reporter pair, in a first set of promoter-reporter pairs, configured to signal pressures of the first stressor in the first population of microbe sensors in Block S160; and, during the first time period, genetically modifying the second population of microbe sensors to include a second microbe promoter-reporter pair, in a second set of promoter-reporter pairs, configured to signal pressures of the second stressor in the second population of microbe sensors in Block S160.

One variation of the method S100 includes accessing a feed of images of a plant canopy in an agricultural environment inhabited by: a population of microbe sensors of a microbe type including a microbe promoter-reporter pair configured to generate microbe-reporter signals of a first signal type and representing pressure of a first stressor, in a set of stressors, at the population of microbe sensors; and a set of sensor plants of a sensor plant type including a plant promoter-reporter pair configured to signal presence of microbe-reporter signals of the first signal type at the set of sensor plants in Block S110. In this variation, the method S100 further includes: accessing a reporter model linking features extracted from images of sensor plants of the sensor plant type to pressures of the set of stressors based on plant-reporter signals generated by the plant promoter-reporter pair and microbe types of microbe sensors inhabiting the agricultural environment in Block S120; and interpreting a first pressure of the first stressor in the agricultural environment during a first time period based on the reporter model, the microbe type, and features extracted from a first subset of images, in the feed of images, captured during the first time period in Block S130. In this variation, the method S100 further includes, in response to the first pressure exceeding a threshold pressure defined for the first stressor: selecting a first mitigation action, in a set of mitigation actions, configured to mitigate the first pressure of the first stressor in Block S140; generating a prompt to execute the first mitigation action; and transmitting the prompt to a user affiliated with the agricultural environment in Block S142.

One variation of the method S100 includes accessing a feed of images of a first population of microbe sensors of a first microbe type and inhabiting a region of an environment in Block S110, microbe sensors of the first microbe type including a first microbe promoter-reporter pair, in a set of microbe promoter-reporter pairs, including: a first microbe promoter, in a set of microbe promoters, linked to a first stressor in a set of stressors; and a first microbe reporter, in a set of microbe reporters, linked to the first microbe promoter and configured to express a microbe-reporter signal representing presence of the first stressor at microbe sensors in the first population of microbe sensors. In this variation, the method S100 further includes: accessing a reporter model linking features extracted from images of microbe sensors of the first microbe type to pressures of the set of stressors based on microbe-reporter signals expressed by the set of microbe promoter-reporter pairs in Block S120; and interpreting a first pressure of the first stressor within the region of the environment, during a first time period, based on the reporter model and features extracted from a first subset of images, in the feed of images, captured during a first time period in Block S130. In this variation, the method S100 further includes: in response to the first pressure of the first stressor exceeding a threshold pressure defined for the first stressor: selecting a first mitigation action, in a set of mitigation actions, configured to mitigate the first pressure of the first stressor in Block S140; generating a prompt to execute the first mitigation action; and transmitting the prompt to a set of users affiliated with the environment in Block S142.

In one variation, Block S110 of the method S100 recites: during a crop-preparation period including the first time period, accessing the feed of images of the first population of microbe sensors of the first microbe type and inhabiting the region of the environment, microbe sensors of the first microbe type including the first microbe promoter-reporter pair, in the set of microbe promoter-reporter pairs. In this variation, the method S100 further includes, during a second time period, succeeding the first time period, within the crop-preparation period: interpreting a second pressure of the first stressor within the region of the environment based on the reporter model and features extracted from a second subset of images, in the feed of images, captured during the second time period in Block S130; characterizing a difference between the first pressure of the first stressor and the second pressure of the first stressor in Block S132; and, in response to the difference exceeding a threshold difference, confirming efficacy of the first mitigation action in the agricultural environment in Block S134.

In one variation, the method S100 further includes, in response to the difference falling below the threshold difference, selecting a second mitigation action, in the set of mitigation actions, in replacement of the first mitigation action, configured to mitigate the second pressure of the first stressor in Block S136.

As shown in FIGS. 4A-4C, 5A, and 5B, one variation of the method S100 includes, during a crop preparation period preceding a growing period for a crop in an agricultural field: accessing a first image, recorded at a first time, of a first microbe sensor population inhabiting an agricultural field, the first microbe sensor population modified to include a set of microbe promoter-reporter pairs configured to signal pressures of a set of stressors in the agricultural field in Block S110; accessing a microbe reporter model linking features extracted from images of microbe sensors to the set of stressors based on signals expressed by the set of microbe promoter-reporter pairs in Block S120; interpreting a first pressure of a first stressor, in the set of stressors, within a first region of the agricultural field based on the microbe reporter model and features extracted from the first image in Block S130. The method S100 further includes, in response to the first pressure of the first stressor exceeding a threshold pressure defined for the first stressor: selecting a first mitigation action, in a set of mitigation actions, corresponding to the first pressure of the first stressor in Block S140; generating a prompt to execute the first mitigation action; and transmitting the prompt to a user affiliated with the agricultural field in Block S142.

In one variation, the method S100 further includes, during the crop preparation period: accessing a second image, recorded at a second time succeeding the first time, of the first microbe sensor population in Block S110; interpreting a second pressure of the first stressor within the first region of the agricultural field based on the microbe reporter model and features extracted from the second image in Block S130; characterizing a difference between the first pressure of the first stressor and the second pressure of the first stressor in Block S132; and, in response to the difference exceeding a threshold difference, confirming efficacy of the first mitigation action in the agricultural field in Block S134.

In one variation, the method S100 further includes, during a growing period succeeding the crop preparation period: accessing a third image of a set of sensor plants inhabiting the agricultural field and genetically modified to include a set of plant promoter-reporter pairs configured to signal pressures of a second set of stressors, including the first stressor, in the agricultural field in Block S110; accessing a plant reporter model linking features extracted from images of sensor plants to the second set of stressors based on signals expressed by the set of plant promoter-reporter pairs in Block S120; and interpreting a third pressure of the first stressor within the first region of the agricultural field based on the plant reporter model and features extracted from the third image in Block S130. In this variation, the method S100 further includes, in response to the third pressure exceeding the threshold pressure and in response to confirming efficacy of the first mitigation action, generating a second prompt to execute the first mitigation action; and transmitting the prompt to a user affiliated with the agricultural field in Block S142.

In one variation, the method S100 further includes, during the crop preparation period: interpreting a second pressure of the first stressor within a second region of the agricultural field based on the microbe reporter model and features extracted from the first image; and deriving a correlation between the first pressure of the first stressor in the first region and the second pressure of the first stressor in the second region. In this variation, the method S100 further includes, during a growing period succeeding the crop preparation period: accessing a third image of a set of sensor plants inhabiting the agricultural field and genetically modified to include a set of plant promoter-reporter pairs configured to signal pressures of a second set of stressors, including the first stressor, in the agricultural field; accessing a plant reporter model linking features extracted from images of sensor plants to the second set of stressors based on signals expressed by the set of plant promoter-reporter pairs; interpreting a third pressure of the first stressor within the first region of the agricultural field based on the plant reporter model and features extracted from the third image; and predicting a fourth pressure of the first stressor within the second region of the agricultural field based on the third pressure and the correlation.

As shown in FIGS. 1A-6, one variation of the method includes: accessing a first set of images of a set of sensor plants recorded during a first period of time, the set of sensor plants inhabiting a region of an agricultural environment and defining a sensor plant type, sensor plants of the sensor plant type including a set of plant promoter-reporter pairs configured to signal detection of a set of microbe-reporter signals expressed within microbe sensor populations inhabiting the region of the agricultural environment in Block S110; accessing a plant reporter model linking characteristics extracted from images of sensor plants of the sensor plant type to the set of microbe-reporter signals in Block S120; characterizing a first microbe-reporter signal based on the first set of images and the plant reporter model in Block S122; and identifying a type of microbe sensor population present within the region during the first period of time in Block S114. In response to identifying the type of microbe sensor population as a first microbe sensor population including a first set of microbe promoter-reporter pairs configured to signal presence of a first set of stressors within the region of the agricultural environment, the method S100 further includes: accessing a first microbe reporter model, in a set of microbe reporter models, linking microbe-reporter signals expressed within the first microbe sensor population to the first set of stressors in Block S116; and characterizing presence of a first stressor, in the first set of stressors, based on the first microbe-reporter signal and the first microbe reporter model in Block S130.

In one variation, the method S100 further includes: accessing a second set of images of the set of sensor plants recorded during a second period of time in Block S110; characterizing a second microbe-reporter signal based on the set of images and the plant reporter model in Block S122; and identifying the type of microbe sensor population present within the region during the second period of time in Block S116. In response to identifying the type of microbe sensor population as a second microbe sensor population including a second set of microbe promoter-reporter pairs configured to signal presence of a second set of stressors within the region of the agricultural environment, the method S400 further includes: accessing a second microbe reporter model, in the set of microbe reporter models, linking microbe-reporter signals expressed within the second microbe sensor population to the second set of stressors in Block S120; and characterizing presence of a second stressor, in the second set of stressors, based on the second microbe-reporter signal and the second microbe reporter model in Block S130.

2. Applications

Generally, a computer system—such as a local or remote computer system in conjunction with a user (e.g., a technician, scientist, agronomist)—can execute Blocks of the method S100 to predict environmental conditions—such as soil conditions (e.g., soil pH, organic carbon levels, nitrogen levels), ambient conditions (e.g., temperature, humidity, water levels), presence of fungi or insects, presence of contaminants (e.g., radioactive material, oil, TNT), etc.— within a region of an agricultural environment based on detectable signals (e.g., fluorescence in the electromagnetic spectrum) expressed by one or more sensor plants present in the region and genetically-modified to: detect a microbe signal expressed by microbes—present at the sensor plant— genetically-modified to signal environmental conditions adverse to plant health or growth; and amplify and relay the microbe signal via expression of a detectable plant signal representative of the detected microbe signal.

More specifically, a population of microbes (e.g., bacteria or fungi) can be genetically engineered to form a microbe sensor population including a set of promoter-reporter pairs (hereinafter "microbe promoter-reporter pairs") configured to signal pressures of a set of stressors in an environment inhabited by the microbe sensor population, each microbe promoter-reporter pair including: a promoter gene sequence (hereinafter a "microbe promoter") configured to selectively activate responsive to presence of (e.g., "linked to") a particular stressor (e.g., fungi, insects, drought, salinity, soil pH); and a microbe reporter gene sequence (hereinafter a "microbe reporter") paired to the microbe promoter—downstream the microbe promoter in a genome of the microbe sensor population—and configured to generate (or "express") a microbe-reporter signal (e.g., an optical signal, a chemical signal) responsive to activation of the microbe promoter.

Further, a population of sensor plants can be genetically engineered to include a set of promoter-reporter pairs (hereinafter "plant promoter-reporter pairs") configured to signal detection of a microbe signal expressed by the microbe sensor population, each plant promoter-reporter pair including: a promoter gene sequence (hereinafter a "plant promoter") configured to activate in the presence of a microbe-reporter signal; and a plant reporter gene sequence (hereinafter a "plant reporter") paired to the plant promoter (e.g., downstream the plant promoter in a genome of the set of sensor plants) and configured to generate (or "express") a plant-reporter signal responsive to activation of the plant promoter.

A computer system (e.g., a remote server, a local device, a computer network) can then execute Blocks of the method S100 to: access an image of the agricultural field containing the microbe sensor populations and sensor plants and collected by various fixed or mobile, local or remote sensors (e.g., a fixed camera mounted to a pole in a field, a smartphone or tablet, a sensor mounted to a truck or 4×4, a sensor mounted to a drone or crop duster, a sensor mounted on a drone or plane, a camera integrated into a satellite); detect the plant-reporter signal in an image of a region of the agricultural field inhabited by the population of sensor plants and the microbe sensor population; interpret this plant-reporter signal as expression of the microbe-reporter signal;

and interpret expression of the microbe-reporter signal as predicted presence (and/or duration, magnitude) of a particular stressor, in the set of stressors, such as based on a reporter model linking expression of plant and/or microbe-reporter signals to presence of the set of stressors. Further, based on prediction of the particular stressor in the agricultural field, the computer system can selectively generate and distribute prompts—such as to a user (e.g., a farmer, an agronomist, a field worker) or users associated with the agricultural field—for mitigating and/or regulating the stressor within the agricultural field.

Therefore, the population of microbe sensors can be configured to: detect presence and/or pressures of various plant stressors—which may affect plant health and/or growth—within the environment; and express microbe-reporter signals—such as including optical (e.g., fluorescence, pigmentation, bioluminescence) or chemical signals (e.g., a peptide signal) detectable by sensor plants—representing these pressures of stressors detected by microbe sensors. The population plant sensors—cohabiting the environment with the population of microbe sensors—can then: detect a microbe-reporter signal expressed by the population of microbe sensors; and amplify this microbe-reporter signal by expressing a corresponding plant-reporter signal (e.g., fluorescence, pigmentation, bioluminescence)—representative of the microbe-reporter signal and thus representative of a pressure of a particular stressor in the environment—that is detectable in images of these environment captured by the imaging system.

2.1 Wide Range of Stressors

By coupling expression of the plant signal to expression of a particular microbe signal output by microbe sensors present at the sensor plant, the computer system can detect and/or predict presence of additional stressors undetectable by sensor plants directly. In particular, microbe sensors can be modified to enable detection of additional "stressors" or environmental conditions—such as presence of various pollutants or other foreign matter, soil carbon content, or soil composition—that may be undetectable by the set of sensor plants individually. Then, the set of sensor plants can be modified to: detect signals (e.g., chemical signals) expressed by these microbe sensors; and express a detectable, amplified signal (e.g., an optical signal) indicating detection of these additional stressors (or environmental conditions) by the microbe sensors. Therefore, the set of sensor plants—in combination with the microbe sensor population—can be configured to signal a wider range of stressors (e.g., plant stressors, soil stressors, environmental stressors or conditions) when combined with the microbe sensor population in the agricultural field.

Further, because these microbe sensors can be rapidly engineered, new microbe sensor populations can be generated—such as configured to detect distinct "stressors" (e.g., plant stressors, soil stressors, environmental conditions) within the agricultural field—and deployed to the agricultural field rapidly, based on particular needs for the agricultural field, such as based on types of stressors present in the agricultural field and/or based on changes in the agricultural field throughout the crop cycle (e.g., pre-planting of crops, growing of crops, post-harvest of crops).

2.2 Replaceable Microbe Sensor Populations

Further, by decoupling expression of the plant signal from presence of a particular stressor—and rather coupling expression of the plant signal to expression of a particular microbe signal output by microbe sensors present at the sensor plant—the sensor plant can be configured to signal detection of different stressors at various times throughout a growing season for the sensor plant, such as based on a type of microbe sensor present in the microbe sensor population at the set of sensor plants.

For example, the set of sensor plants can be genetically engineered to include: a plant promoter linked to expression of a microbe-reporter signal (e.g., a chemical signal); and a plant reporter configured to express a plant-reporter signal responsive to expression of the plant promoter. At a first time, the microbe sensor population can include microbe sensors of a first microbe type including: a first microbe promoter linked to presence of fungi; and a first microbe reporter configured to express the microbe-reporter signal (e.g., a chemical signal) responsive to expression of the first microbe promoter. Then, in response to detection (e.g., via the remote sensing system) of the plant-reporter signal, the computer system can interpret a fungal presence at the set of sensor plants based on images of the set of sensor plants, a reporter model, and the first microbe type. Then, at a second time succeeding the first time, the microbe sensor population can include microbe sensors of a second microbe type including: a second microbe promoter linked to soil pH; and the first microbe reporter configured to express the microbe-reporter signal responsive to expression of the second microbe promoter. Then, in response to detection (e.g., via the remote sensing system) of the plant-reporter signal, the computer system can interpret soil pH at the set of sensor plants based on images of the set of sensor plants, the reporter model, and the second microbe type.

Therefore, new microbe populations—configured to detect different stressors in the environment—can be rapidly generated and deployed to the environment to enable detection of new stressors in the environment over time, such as without replacing or generating new sensor plants.

3. Terms

As described above, a microbe sensor is referred to herein as a microbe configured to signal presence of a particular stressor or set of stressors within and/or at (e.g., experienced by) the microbe. A microbe sensor can be genetically-modified to include a set of promoter-reporter pairs (e.g., one promoter-reporter pair, three promoter-reporter pairs) configured to trigger generation of a detectable signal (hereinafter a "microbe-reporter signal") or signals by the microbe sensor in the presence of a particular stressor or set of stressors. For example, a microbe sensor can be genetically-modified to include a first promoter-reporter pair configured to trigger generation of a red fluorescence signal by the microbe sensor in the presence of fungi. Thus, the microbe sensor can generate a signal that, when detected (e.g., by a sensor plant), may signify presence and/or magnitude of a particular stressor or stressors at the microbe sensor.

As described above, a sensor plant is referred to herein as a plant configured to signal presence of a particular microbe-reporter signal and/or set of stressors within and/or at (e.g., experienced by) the plant. A sensor plant can be genetically-modified to include a set of promoter-reporter pairs (e.g., one promoter-reporter pair, three promoter-reporter pairs) configured to trigger generation of a detectable signal or signals by the sensor plant in the presence of a particular microbe-reporter signal and/or set of stressors. For example, a sensor plant can be genetically-modified to include a first promoter-reporter pair configured to trigger generation of a red fluorescence signal by the sensor plant in the presence of a corresponding fluorescence signal expressed by microbe sensors present at the sensor plant. Thus, the sensor plant can generate a detectable signal that, when detected, may alert a user (e.g., a farmer, an agronomist, a botanist) associated with the sensor plant of a stressor or stressors present.

As described above, a "stressor" is referred to herein as a type of biotic and/or abiotic stress (e.g., physical and/or chemical stress) and/or environmental condition that may affect plant health, such as pest, fungi, disease, weeds, nutrition, drought, water, salinity, temperature, wind, soil pH, soil nitrogen levels, oxidative, contaminants, and/or any other type environmental condition. For example, a plant or microbe may experience a salinity stressor corresponding to soil salinity at the plant that may hinder plant growth. In another example, a plant or microbe may experience a fungi stressor corresponding to presence of a fungi pressure at the plant that may hinder plant growth.

As described above, a "pressure" is referred to herein as a measurable and/or detectable amount or presence of a particular stressor and/or set of stressors detected by microbe sensors in an agricultural field. For example, the computer system can detect an insect stressor and—based on features extracted from images of an agricultural field—estimate a pressure (e.g., measurable presence, distribution, magnitude) of this insect stressor in the agricultural field. Therefore, a pressure represents a measurable amount or presence of a particular stressor.

As described above, a "user" is referred to herein as a person associated with an environment including microbe sensors and/or sensor plants, such as an agricultural field, a crop of plants, a greenhouse, an arboretum, a laboratory. For example, a user may refer to a farmer associated with a particular agricultural field. In another example, a user may refer to an agronomist associated with a particular crop of plants. In another example, a user may refer to a scientist studying or developing sensor plants and/or treatments of stressors in sensor plants and non-sensor plants.

As describe above, a "promoter-reporter pair" is referred to herein as: a promoter gene sequence (hereinafter a "promoter") configured to activate in the presence of (e.g., "linked to") a particular stressor (e.g., fungi, insects, drought) and/or a particular microbe-reporter signal (e.g., fluorescence, bioluminescence, chemical); and a reporter gene sequence (hereinafter a "reporter") paired to the promoter (e.g., downstream the promoter in a genome of genetically-modified microbe sensors and/or sensor plants) and configured to generate (or "express") a reporter signal responsive to activation of the promoter. The promoter and the reporter can therefore form a promoter-reporter pair. In one implementation, the promoter-reporter pair includes a sequence of promoter-reporter pairs linking the reporter to the promoter, such that activation of the promoter triggers activation (e.g., expression) of the sequence of promoter-reporter pairs, thereby triggering expression of the reporter.

4. Living Sensors: Microbe Sensor+Sensor Plant

Generally, a population of microbe sensors (hereinafter a "microbe sensor population") can cooperate with a set of sensor plants (e.g., one sensor plant, a cluster of sensor plants, a crop of sensor plants)—each cohabiting an agricultural environment (e.g., a region of a crop, a greenhouse)—to detect and signal stressors experienced by microbe sensors in the microbe sensor population and/or sensor plants in the set of sensor plants, in the agricultural environment.

In particular, the microbe sensor population—such as a population of genetically-engineered bacteria and/or fungi—can be configured to: detect a stressor present within a region of an agricultural environment (e.g., a crop, a greenhouse) inhabited by the microbe sensor population; and produce a microbe-reporter signal to indicate presence of the stressor in the region. The set of sensor plants—inhabiting the region of the agricultural environment—can then be configured to: detect this microbe-reporter signal; and produce a detectable plant-reporter signal (e.g., in the electromagnetic spectrum) indicating expression of the microbe-reporter signal within the microbe sensor population, and thereby indicating presence of the stressor—linked to this microbe-reporter signal—in the region of the agricultural environment. The microbe sensor population and the set of sensor plants can thus form a population of living sensors configured to signal pressures of various stressors in the agricultural environment inhabited by these living sensors (e.g., microbe sensors and/or sensor plants).

4.1 Microbe Sensor

Generally, a microbe sensor population can be modified (e.g., genetically engineered) to express detectable signals (e.g., optical signals) responsive to detection of a set of stressors (e.g., abiotic and/or biotic stressors, environmental conditions) present in an agricultural field inhabited by the microbe sensor population. In particular, each microbe sensor, in the microbe sensor population, can be configured to: detect a stressor present at the microbe sensor (e.g., within a region including the microbe sensor) and therefore in a region of the set of sensor plants; and express a signal—detectable by a remote sensing system (e.g., an optical sensor) and/or a sensor plant (e.g., by a plant promoter of the sensor plant) to indicate presence of the stressor in the sensor plant or in a region of a crop where the sensor plant is located more generally.

In one implementation, the microbe sensor population can be genetically engineered to include a set of microbe promoter-reporter pairs configured to signal pressures of a set of stressors—such as pollutants, low soil carbon content, low or high soil pH, parasites, fungi—at/or proximal the microbe sensor population, each microbe promoter-reporter pair, in the set of microbe promoter-reporter pairs, including: a microbe promoter, in a set of microbe promoters, linked to a particular stressor in the set of stressors; and a microbe reporter, in a set of microbe reporters, linked to the microbe promoter—thus forming the microbe promoter-reporter pair—configured to express a microbe-reporter signal responsive to expression of the microbe promoter. Therefore, the microbe sensor population can be configured to selectively output a particular microbe-reporter signal, in a set of microbe-reporter signals, responsive to expression of a corresponding microbe promoter-reporter pair, in the set of microbe promoter-reporter pairs, linked to presence of a particular stressor in the set of stressors. The set of sensor plants can then: detect this microbe-reporter signal expressed by the microbe sensor population; and amplify this microbe-reporter signal by expressing a plant-reporter signal (e.g., an optical signal) responsive to detection of the microbe-reporter signal.

4.1.1 Microbe Promoter-Reporter Pairs

Each microbe sensor, in the microbe sensor population, can be genetically modified to include promoter-reporter pairs that indicate presence of stressors experienced by the microbe sensor. To detect presence of these stressors, a reporter that expresses a certain microbe signal—such as fluorescence, bioluminescence, pigmentation changes, chemical reaction, peptide expression, etc.—can be coupled to the promoter of choice, each promoter configured to selectively activate responsive to presence of (e.g., "linked to") a particular stressor. More specifically, the reporter can initiate a metabolic change in the microbe sensor such that the microbe signal is produced. Therefore, when the microbe sensor expresses the promoter linked to the particular stressor, the reporter tagged to this promoter is also expressed and produces the microbe signal. For example, each microbe sensor, in a microbe sensor population, can be genetically modified to fluoresce (i.e., absorb photons at one frequency and emit photons at a different frequency) in the presence of (and proportional to) one or more stressors, such as: fungi; bacteria; nematodes; parasites; viruses; insects; contaminants; heat; soil pH stress (elevated soil pH, reduced soil pH); water stress (e.g., drought, flood); nutrient stress; and/or phytoplasmal disease.

To generate the microbe sensor population, a microbe genome can be genetically-modified to couple a known reporter gene with a certain biological process. Molecular genetic techniques can be implemented to associate expression of the reporter gene with certain biological stresses and traits. Therefore, the reporter gene can act as a signal of a biological stress or trait in the microbe sensor population. For example, the sensor plant can be modified to fluoresce (i.e., absorb photons at one frequency and emit photons at a different frequency) in the presence of (and proportional to) a disease or stressor. In this example, the sensor plant can be modified to fluoresce in the presence of one or more disease or stressors, such as: fungi, bacteria, nematode, parasites, viruses, insects, heat, water stress, nutrient stress, phytoplasmal disease, etc. In another example, the sensor plant can be modified to signal presence of a stressor via bioluminescence of the sensor plant. In yet another example, the sensor plant can be modified to signal presence of a stressor via a pigmentation change of the sensor plant.

In one implementation, a microbe sensor population can be configured to include a microbe promoter-reporter pair configured to signal presence of a stressor, the microbe promoter-reporter pair including: a first microbe promoter that activates (i.e., expresses) responsive to direct detection of a first stressor at the microbe sensor (e.g., in a region of the agricultural field including the microbe sensor); and a first microbe reporter—coupled to the first microbe promoter—and configured to express the first microbe-reporter signal in response to activation of the first microbe promoter by the first stressor. For example, a microbe sensor can include a first microbe promoter-reporter pair including: a first promoter configured to express responsive to detection of a first stressor (e.g., low or high soil pH levels, low or high nitrogen levels in the soil, parasites, pathogens, insects, fungi, dehydration, oils, radioactivity, low soil carbon content); and a first microbe reporter configured to express a first microbe-reporter signal (e.g., a fluorescence signal, a bioluminescence signal, a pigmentation signal, a chemical signal) responsive to expression of the first microbe promoter.

4.1.1.1 One Microbe Promoter+One Microbe Reporter

In one implementation, the microbe sensor population (i.e., a genome of the microbe sensor population) can be configured to include a single microbe promoter-reporter pair—including a microbe promoter linked to a microbe reporter—configured to signal presence of a particular stressor, in a set of stressors (e.g., fungi, insects, drought, overhydration, nutrient deficiency). In particular, in this implementation, the microbe sensor population can be genetically engineered to include a microbe promoter-reporter pair including: a microbe promoter linked to a particular stressor, in the set of stressors; and a microbe reporter configured to express a microbe-reporter signal, in the set of microbe-reporter signals, responsive to activation of the microbe promoter.

Additionally, the microbe sensor population can be genetically engineered to include multiple microbe promoter-reporter pairs configured to signal presence of multiple stressors. In particular, in this implementation, the microbe sensor population can be genetically engineered to include a set of microbe promoter-reporter pairs configured to signal presence of a set of stressors, each microbe promoter-reporter pair, in the set of microbe promoter-reporter pairs, configured to signal presence of a particular stressor, in the set of stressors.

For example, the microbe sensor population can be genetically engineered to include: a first microbe promoter-reporter pair including a first microbe promoter linked to a first microbe reporter; and a second microbe promoter-reporter pair including a second microbe promoter linked to a second microbe reporter. More specifically, in this example, the first microbe promoter-reporter pair can include: a first microbe promoter linked to a first stressor (e.g., a pollutant), in the set of stressors; and a first microbe reporter (e.g., a peptide) configured to express a first microbe-reporter signal (e.g., a peptide signal or a detectable amount of the peptide), in the set of microbe-reporter signals, responsive to activation of the first microbe promoter. The second microbe reporter can include: a second microbe promoter linked to a second stressor (e.g., a soil mineral deficiency), in the set of stressors; and a second microbe reporter (e.g., a steroid) configured to express a second microbe-reporter signal (e.g., a steroid signal or a detectable amount of the steroid), in the set of microbe-reporter signals, responsive to activation of the second microbe promoter. Thus, in this example, the microbe sensor population can be configured to: express the first microbe-reporter signal (e.g., the peptide signal) in the presence of the first stressor (e.g., the pollutant); and express the second microbe-reporter signal (e.g., the steroid signal) in the presence of the second stressor (e.g., soil mineral deficiency).

4.1.1.2 Multiple Microbe Promoters+One Microbe Reporter

In another implementation, the microbe sensor population can be configured to include multiple microbe promoters paired with a single microbe reporter. In particular, in this implementation, the microbe sensor population can be genetically engineered to include a set of microbe promoter-reporter pairs configured to: detect presence of a set of stressors at and/or proximal the microbe sensor population; and express a single microbe-reporter signal indicating detection of one or more stressors, in the set of stressors.

For example, the microbe sensor population can be genetically engineered to include: a first microbe promoter-reporter pair configured to detect and signal presence of a first stressor (e.g., dehydration), in a set of stressors; and a second microbe promoter-reporter pair configured to detect and signal presence of a second stressor (e.g., overhydration) in the set of stressors. In this example, the first microbe promoter-reporter pair can include: a first microbe promoter linked to the first stressor (e.g., dehydration); and a first microbe reporter—linked to the first microbe promoter—configured to express a microbe-reporter signal (e.g., a particular chemical signal) responsive to activation of the first microbe promoter. The second microbe promoter-reporter pair can include: a second microbe promoter linked to the second stressor (e.g., overhydration); and the first microbe reporter—linked to the second microbe promoter—configured to express the microbe-reporter signal (e.g., the particular chemical signal) responsive to activation of the second microbe promoter. Thus, in this example, the microbe sensor population can be configured to: express the microbe-reporter signal in the presence of the first stressor (e.g., dehydration) and/or in the presence of the second stressor (e.g., overhydration).

4.1.1.3 Multiple Microbe Promoters+Multiple Microbe Reporters

In another implementation, the microbe sensor population can be configured to include multiple microbe promoters and multiple microbe reporters.

In particular, in this implementation, the microbe sensor population can be genetically engineered to include a set of microbe promoter-reporter pairs, each microbe promoter-reporter pair, in the set of microbe promoter-reporter pair, including: a microbe promoters, in a set of microbe promoters, linked to a particular stressor in a set of stressors detectable by the microbe sensor population; and a microbe reporter, in a set of microbe reporters, linked to the microbe promoter and configured to express a microbe-reporter signal, in a set of microbe-reporter signals, responsive to expression of the microbe promoter.

4.2. Sensor Plant

Generally, a sensor plant includes a set of plant promoter-reporter pairs configured to trigger generation of a detectable signal (hereinafter a "plant-reporter signal") linked to presence and/or magnitude of a set of stressors (e.g., biotic and abiotic stressors) within a region including the sensor plant.

In particular, a sensor plant can be genetically modified to include a set of plant promoter-reporter pairs configured to signal pressure (e.g., presence and/or magnitude) of a set of stressors proximal (e.g., within a region containing the sensor plant, within the sensor plant) the sensor plant, each plant promoter-reporter pair, in the set of plant promoter-reporter pairs, including: a plant promoter (i.e., a promoter gene) configured to express in the presence of a particular stressor and/or microbe-reporter signal indicative of presence of the particular stressor; and a plant reporter (i.e., a reporter gene) coupled to the plant promoter (e.g., downstream the plant promoter in a genome of the sensor plant) and configured to express a plant-reporter signal (e.g., a detectable, optical signal)—representative of presence and/or magnitude of the particular stressor at the sensor plant—responsive to expression of the plant promoter.

In one implementation, the sensor plant can be configured to detect and signal presence of a set of microbe-reporter signals at the sensor plant. In particular, in this implementation, the sensor plant can be modified to include a first promoter-reporter pair including: a first plant promoter that activates responsive to detection of a first microbe-reporter signal (e.g., a chemical signal) associated with the presence of a first stressor; and a first plant reporter coupled to the first plant promoter and configured to generate a first plant-reporter signal (e.g., a fluorescence signal, a pigmentation signal, a bioluminescence signal) in response to activation of the first plant promoter by the first microbe-reporter signal. Additionally and/or alternatively, in this implementation, the sensor plant can further include a second plant promoter-reporter pair including: a second plant promoter that activates responsive to detection of a second microbe-reporter signal at the sensor plant; and a second plant reporter coupled to the second plant promoter and configured to generate a second plant-reporter signal in response to activation of the second plant promoter by the second microbe-reporter signal, the second plant-reporter signal distinct from the first plant-reporter signal. Additionally and/or alternatively, in this implementation, the sensor plant can further include additional plant promoter-reporter pairs—such as a third, fourth, and/or fifth plant promoter-reporter pair—configured to detect additional microbe-reporter signals and generate distinct plant-reporter signals responsive to detection of these microbe-reporter signals.

In the preceding implementation, a microbe sensor population can be applied to a region of an agricultural field including the sensor plant. Each microbe sensor, in the microbe sensor population, can include: a first microbe promoter that activates responsive to direct detection of a first stressor at the microbe sensor (e.g., in the region of the sensor plant); and a first microbe reporter coupled to the first microbe promoter and configured to express the first microbe-reporter signal (e.g., a chemical signal detectable by the sensor plant) in response to activation of the first microbe promoter by the first stressor.

Additionally and/or alternatively, in another implementation, a sensor plant can be configured to directly detect and signal presence of a set of stressors at the sensor plant. In particular, in this implementation, the sensor plant can be modified to include a first plant promoter-reporter pair including: a first plant promoter that activates responsive to direct detection of a first stressor at the sensor plant; and a first plant reporter coupled to the first plant promoter and configured to express a first plant-reporter signal (e.g., a fluorescence signal, a pigmentation signal, a bioluminescence signal) in response to activation of the first plant promoter by the first stressor. Additionally and/or alternatively, in this implementation, the sensor plant can further include a second plant promoter-reporter pair including: a second plant promoter that activates responsive to direct detection of a second stressor at the sensor plant; and a second plant reporter coupled to the second plant promoter and configured to express a second plant-reporter signal in response to activation of the second plant promoter by the second stressor, the second plant-reporter signal distinct from the first plant-reporter signal. Additionally and/or alternatively, in this implementation, the sensor plant can further include additional plant promoter-reporter pairs—such as a third, fourth, and/or fifth plant promoter-reporter pair—configured to directly detect additional stressors and generate distinct plant-reporter signals responsive to detection of these stressors.

The sensor plant can be configured to experience, react, and deteriorate in the presence of certain plant stressors in the same or similar measures as comparable non-sensor plants planted in the crop when exposed to these plant stressors and stressors. Therefore, the sensor plant may function as an accurate sensor and predictor of disease and/or stressors in these nearby crops. For example, sensor plants can be deployed to an agricultural field and planted with other non-sensor plants—such as in clusters of sensor plants and/or randomly-distributed sensor plants surrounded by non-sensor plants— in order to detect, measure, and communicate certain stressors in these sensor plants, which may then be interpolated or extrapolated to stressors in nearby non-sensor plants. In another example, sensor plants can be deployed to an agricultural field and planted as an entire crop without non-sensor plants.

5. Signaling Pathway: Microbe Sensor+Sensor Plant

Generally, a microbe sensor population—modified to include a set of microbe promoter-reporter pairs—can be deployed to a region of an agricultural field inhabited by (e.g., currently, designated for) a set of sensor plants modified to include a set of plant promoter-reporter pairs configured to detect and signal presence of a set of microbe-reporter signals expressed by the set of microbe promoter-reporter pairs. The set of microbe promoter-reporter pairs of the microbe sensor population can thus be configured to cooperate with the set of plant promoter-reporter pairs of the set of sensor plants to form a stressor signaling pathway.

In particular, each plant promoter-reporter pair, in the set of plant promoter-reporter pairs, can include a plant promoter, in a set of plant promoters, configured to express responsive to presence of a particular microbe-reporter signal (e.g., fluorescence, chemical, pigmentation) expressed by a corresponding microbe reporter, in a set of microbe reporters, of the set of microbe promoter-reporter pairs.

The microbe sensor population can therefore be configured to: detect presence of the set of stressors; and generate a set of microbe-reporter signals—such as a set of chemical signals (e.g., a particular peptide signal, a particular steroid signal)—responsive to detection of the set of stressors. The set of sensor plants can be configured to: detect the set of microbe-reporter signals; and generate a set of plant-reporter signals responsive to detection of the set of microbe-reporter signals. The computer system can then access images of the set of sensor plants—depicting the set of plant-reporter signals—to interpret presence of the set of stressors.

5.1 Singular Signaling Pathway: One Microbe-Reporter Signal+One Plant-Reporter Signal In one implementation, the living sensor population can include: a microbe sensor population configured (e.g., genetically engineered) to include a microbe promoter-reporter pair configured to signal presence of a stressor in a set of stressors; and a set of sensor plants (e.g., a single sensor plant, a cluster of sensor plants, a crop of sensor plants) configured to include a plant promoter-reporter pair configured to signal expression of the microbe promoter-reporter pair.

In particular, in this implementation, the microbe sensor population can be configured to include the microbe promoter-reporter pair including: a microbe promoter linked to (e.g., configured to express in the presence of) the first stressor; and a microbe reporter—paired with the microbe promoter—configured to express a microbe-reporter signal responsive to activation of the microbe promoter. In this implementation, the set of sensor plants can be configured to include the plant promoter-reporter pair including: a plant promoter linked to (e.g., configured to express in the presence of) the microbe-reporter signal; and a plant reporter— paired with the plant promoter—configured to express a plant-reporter signal responsive to activation of the plant promoter. The computer system can then: access images (e.g., hyperspectral images) of the set of sensor plants captured by the remote sensing system; and extract characteristics (e.g., intensity of fluorescence at particular wavelengths) from the set of images to interpret presence of the first stressor at the set of sensor plants, such as based on correlations between the plant-reporter signal, the microbe-reporter signal, and presence of the first stressor.

For example, the living sensor population can include: a microbe sensor population genetically engineered to include a microbe promoter-reporter pair configured to express a chemical microbe signal (e.g., an amount of a first compound) in the presence of an insect pressure; and a set of sensor plants genetically engineered to include a plant promoter-reporter pair configured to express red-fluorescent proteins—and thereby emit a red-fluorescence plant signal—in the presence of the chemical microbe signal expressed by the microbe sensor population. In particular, in this example, the microbe promoter-reporter pair can include: a microbe promoter (e.g., a promoter gene sequence, a chain of gene sequences) configured to activate in the presence of the first stressor; and a chemical microbe reporter (e.g., a gene for a particular chemical compound)— paired with the microbe promoter—configured to express the chemical microbe signal responsive to activation of the microbe promoter. The plant promoter-reporter pair can include: a plant promoter configured to activate in the presence of the chemical microbe signal; and a red-fluorescent plant reporter (e.g., a red-fluorescent protein gene)— paired with the plant promoter—configured to express the red-fluorescence plant signal responsive to activation of the plant promoter.

The microbe promoter-reporter pair and the plant promoter-reporter pair can therefore cooperate to form a signaling chain configured to: detect presence of the first stressor at the microbe promoter; express the microbe promoter responsive to detection of the first stressor; express the chemical microbe reporter and therefore express the chemical microbe signal—detectable by the set of sensor plants—responsive to expression of the microbe promoter; detect presence of the chemical microbe signal at the plant promoter; express the plant promoter responsive to detection of the chemical microbe signal; express the red-fluorescent plant reporter and therefore express the red-fluorescence plant signal—detectable by the remote sensing system— responsive to expression of the plant promoter.

In another example, the living sensor population can include: a microbe sensor population genetically engineered to include a microbe promoter-reporter pair configured to express a chemical microbe signal—such as an amount of a target peptide—in the presence of a soil nitrogen deficiency; and a set of sensor plants genetically engineered to include a plant promoter-reporter pair (e.g., a biosynthetic pathway) configured to generate an optical signal—such as via expression of a particular enzyme (e.g., a betalain enzyme) that triggers a pigmentation signal (e.g., pigmentation change) in leaves of sensor plants—in the presence of the chemical microbe signal expressed by the microbe sensor population. In particular, in this example, the microbe promoter-reporter pair can include: a microbe promoter configured to activate in the presence of a nitrogen deficiency; and a microbe reporter—paired with the microbe promoter—configured to express the chemical microbe signal responsive to activation of the microbe promoter. The plant promoter-reporter pair can include: a plant promoter—such as a particular enzyme or sequence of enzymes—configured to activate in the presence of the chemical microbe signal; and a plant reporter—such as a final enzyme in the sequence of enzymes—paired with the plant promoter and configured to trigger the pigmentation change in leaves of sensor plants responsive to activation of the plant promoter.

The microbe promoter-reporter pair and the plant promoter-reporter pair can therefore cooperate to form a signaling chain configured to: detect presence of the nitrogen deficiency at the microbe sensor; express the microbe promoter responsive to detection of the nitrogen deficiency; express the chemical microbe reporter and therefore express the chemical microbe signal—detectable by the set of sensor plants—responsive to expression of the microbe promoter; detect presence of the chemical microbe signal at the sensor plant; express the plant promoter responsive to detection of the chemical microbe signal; express the plant reporter and therefore trigger the pigmentation change in leaves of the sensor plant—detectable by the remote sensing system—responsive to expression of the plant promoter.

5.2 Multiple, Discrete Signaling Pathways

In another implementation, the living sensor population can include: a microbe sensor population configured (e.g., genetically engineered) to include multiple microbe promoter-reporter pairs configured to signal presence of a set of stressors; and a set of sensor plants (e.g., a single sensor plant, a cluster of sensor plants, a crop of sensor plants) configured to include multiple plant promoter-reporter pairs configured to signal expression of the microbe promoter-reporter pair. In this implementation, each plant promoter-reporter pair can be linked to a particular microbe promoter-reporter pair, such that detection (e.g., by the remote sensing system and/or computer system) of a plant-reporter signal, expressed by the plant promoter-reporter pair, can be linked to presence of a particular stressor linked to the particular microbe promoter-reporter pair.

For example, the living sensor population can include: a microbe sensor population configured to detect and signal presence of a set of stressors; and a set of sensor plants configured to detect signals, generated by the microbe sensor population, and relay these signals (e.g., for detection by the remote sensing system) thereby indicating detection of the set of stressors. In particular, in this example, the microbe sensor population can be genetically engineered to include: a first microbe promoter-reporter pair configured to express a first compound—and thereby emit a first microbe signal—in the presence of an environmental contaminant; and a second microbe promoter-reporter pair configured to express a second compound—and thereby emit a second microbe signal—in the presence of a fungi pressure. The set of sensor plants can be genetically engineered to include: a first plant promoter-reporter pair configured to express red-fluorescent proteins—and thereby emit a red-fluorescence plant signal—in the presence of the first microbe signal; and a second plant promoter-reporter pair configured to express yellow-fluorescent proteins—and thereby emit a yellow-fluorescence plant signal—in the presence of the second microbe signal.

Therefore, the first microbe promoter-reporter pair and the first plant promoter-reporter pair can cooperate to form a first signaling chain configured to: detect presence of the environmental contaminant and express the first microbe signal (e.g., an amount of the first compound)—detectable by the set of sensor plants—responsive to detection of the environmental contaminant; and detect presence of the first microbe signal and express the red-fluorescence plant signal—detectable by the remote sensing system—responsive to detection of the first microbe signal. Further, the second microbe promoter-reporter pair and the second plant promoter-reporter pair can cooperate to form a second signaling chain configured to: detect presence of fungi pressures and express the second microbe signal (e.g., an amount of the second compound)—detectable by the set of sensor plants—responsive to detection of a fungi pressure; and detect presence of the second microbe signal and express the yellow-fluorescence plant signal—detectable by the remote sensing system—responsive to detection of the second microbe signal.

5.3 Branched Signaling Pathway: Multiple Stressors+Universal Plant-Reporter Signal In one variation, the living sensor population can include: a microbe sensor population configured to detect presence of a set of stressors and generate a set of microbe-reporter signals indicating presence of the set of stressors; and a set of sensor plants configured to detect the set of microbe-reporter signals, emitted by the microbe sensor population, and relay these microbe-reporter signals in a single, universal plant-reporter signal—detectable by the remote sensing system—thereby indicating detection of one or more stressors, in the set of stressors.

5.3.1. Multiple Microbe-Reporter Signals: One Microbe Promoter+One Microbe Reporter In one implementation, the microbe sensor population can be configured to include a set of promoter-reporter pairs, each promoter-reporter pair configured to: detect presence of a particular stressor, in a set of stressors; and express a discrete microbe-reporter signal, in a set of microbe-reporter signals, responsive to detection of the particular stressor. The set of sensor plants can be configured to detect each microbe-reporter signal, in the set of microbe-reporter signals, and express a universal plant-reporter signal—detectable by the remote sensing system—responsive to detection of a microbe-reporter signal.

For example, the microbe sensor population can be genetically engineered to include: a first microbe promoter-reporter pair configured to express an amount of a particular peptide—and thereby emit a peptide microbe signal—in the presence of an insect pressure; and a second microbe promoter-reporter pair configured to express an amount of a particular steroids—and thereby emit a steroid microbe signal—in the presence of a fungi pressure. In particular, the first microbe promoter-reporter pair can include: a first microbe promoter configured to activate in the presence of an insect pressure; and a first microbe reporter (e.g., a peptide gene)—paired with the first microbe promoter—configured to express the peptide microbe signal responsive to activation of the first microbe promoter. The second microbe promoter-reporter pair can include: a second microbe promoter configured to activate in the presence of a fungi pressure; and a second microbe reporter (e.g., a steroid gene)—paired with the second microbe promoter—configured to express the steroid microbe signal responsive to activation of the second microbe promoter.

In this example, the set of sensor plants can be genetically engineered to include a plant promoter-reporter pair configured to express green-fluorescent proteins—and thereby emit a green-fluorescence plant signal—in the presence of a microbe-reporter signal, in the set of microbe-reporter signals. In particular, the plant promoter-reporter pair can include: a plant promoter configured to activate in the presence of the peptide microbe reporter and in the presence of the steroid microbe reporter; and a plant reporter (e.g., a green-fluorescent protein gene)—paired with the plant promoter—configured to express the green-fluorescence plant signal responsive to activation of the plant promoter. The plant promoter-reporter pair is therefore configured to express green-fluorescent proteins—and thereby emit a green-fluorescence plant signal—in the presence of the peptide microbe signal, in the presence of the steroid microbe signal, and in the presence of both the peptide- and steroid microbe signals.

Therefore, the first microbe promoter-reporter pair, the second microbe promoter-reporter pair, and the plant promoter-reporter pair can cooperate to form a signaling chain configured to: detect presence of insect pressures and express the peptide microbe signal—detectable by the set of sensor plants—responsive to detection of an insect pressure; detect presence of fungi pressures and express the steroid microbe signal—detectable by the set of sensor plants—responsive to detection of a fungi pressure; detect presence of peptide and steroid microbe signals and express the green-fluorescence plant signal—detectable by the remote sensing system—responsive to detection of the peptide microbe signal and/or the steroid microbe signal.

5.3.2 Universal Microbe-Reporter Signal: Multiple Microbe Promoters+One Microbe Reporter Alternatively, in another implementation, the microbe sensor population can be configured to include a set of promoter-reporter pairs, each promoter-reporter pair configured to: detect presence of a particular stressor, in a set of stressors; and express a universal microbe-reporter signal responsive to detection of the particular stressor. The set of sensor plants can be configured to detect this universal microbe-reporter signal and express a universal plant-reporter signal responsive to detection of the universal microbe-reporter signal.

For example, the microbe sensor population can be genetically engineered to include: a first microbe promoter-reporter pair configured to express a chemical microbe signal in the presence of an insect pressure; and a second microbe promoter-reporter pair configured to express the chemical microbe signal in the presence of a fungi pressure. In particular, the first microbe promoter-reporter pair can include: a first microbe promoter configured to activate in the presence of an insect pressure; and a microbe reporter (e.g., a gene for a particular chemical compound)—paired with the first microbe promoter—configured to express the chemical microbe signal responsive to activation of the first microbe promoter. The second microbe promoter-reporter pair can include: a second microbe promoter configured to activate in the presence of a fungi pressure; and the first microbe reporter—paired with the second microbe promoter—configured to express the chemical microbe signal responsive to activation of the second microbe promoter. In this example, the microbe sensor population is therefore configured to express the chemical microbe signal in the presence of insect pressures, in the presence of fungi pressures, and/or in the presence of both insect and fungi pressures. The set of sensor plants can then be configured to include a plant promoter-reporter pair configured to express a plant-reporter signal (e.g., an optical plant signal) in the presence of the chemical microbe signal.

6. Deployment

A microbe sensor population can be deployed to an agricultural environment for detection of stressors within the agricultural environment.

In one implementation, a microbe sensor population can be applied via an irrigation system for a particular agricultural environment. In this implementation, a microbe sensor population can be mixed (e.g., with other ingredients) to generate a microbial mixture (e.g., a fluid microbial mixture) that can be injected into the irrigation system for dispensation in the particular agricultural environment (e.g., across an entire crop, across a region of a crop).

In another implementation, a microbe sensor population can be applied manually by a user (e.g., a field operator) associated with the agricultural field, such as via agricultural equipment operated by the user. For example, the microbe sensor population can be applied via a tractor, a crop duster, a plow, a fertilizer spreader, a seeder, a sprayer, etc.

In yet another implementation, a microbe sensor population can be deployed manually by a user (e.g., a farmer, an agronomist) affiliated with the agricultural environment. Similarly, in this implementation, a microbe sensor population can be mixed (e.g., with other ingredients) to generate a microbial mixture that can be manually applied—such as by spraying from a spray bottle loaded within the microbial mixture—by the user to a region of the agricultural environment. For example, the user may manually apply a volume of the microbial mixture—including a microbe sensor population—to a particular region of her crop, such as along a border of her crop and a neighboring crop and/or proximal an area of the crop prone to flooding.

Alternatively, in another implementation, a microbe sensor population can be included in a coating (or a "microbial coating") applied to seeds (e.g., corn seeds, tomato seeds, soybean seeds) before planting in an agricultural environment. In this implementation, microbe sensors in the microbial coating can disperse in the soil in the agricultural environment upon planting of seeds coated in the microbial coating in the agricultural environment.

Additionally, in this implementation, the microbial coating can be configured to promote plant health (e.g., growth, nutrition, tolerance to stressors). For example, the microbe sensor population can include nitrogen-fixing microbes (e.g., nitrogen-fixing bacteria). This microbe sensor population can be mixed (e.g., with other ingredients) to generate a microbial coating which can then be applied to a batch of soybean seeds. Soybean seeds from this batch of soybean seeds can then be planted in a soybean crop. Once these soybean seeds are planted in soil in the soybean crop, nitrogen-fixing microbes present in the microbial coating applied to the soybean seeds can disperse within the soil (e.g., proximal a corresponding soybean seed) and convert atmospheric nitrogen present in the soil into ammonia (i.e., fixed inorganic nitrogen).

Additionally, microbe sensors can be configured to survive within a particular region within the agricultural environment in order to limit dispersion of microbe sensors outside of the agricultural environment. For example, microbe sensors can be genetically modified to consume a particular type of food source available within the particular region, such as a food source provided by plants in the particular region of the agricultural environment and/or a food source included in a microbial mixture (e.g., dispersed via the irrigation system) or microbial coating. By thus limiting food available to these microbe sensors to food only available within the region of the agricultural environment, the microbe sensors can be confined to this region of the agricultural environment (e.g., in order to survive).

Further, once this food source is depleted, microbe sensors present in this region of the agricultural environment may die due to starvation, thereby limiting a lifespan of these microbe sensors. Dispersion and/or propagation of microbe sensors within the region of the agricultural environment can therefore be controlled due to the limited and controlled lifespan of these microbe sensors, thereby enabling control of spread of microbe sensors and/or introduction of new microbe sensor populations (e.g., configured to detect different stressors).

7. Plant Life Cycle: Replacing Microbe Sensor Populations

In one implementation, microbe sensor populations—present at the set of sensor plants—can be replaced over time by different microbe sensor populations including different types of microbe sensors (e.g., configured to detect different stressors). In this implementation, microbe sensor populations can be applied to the set of sensor plants according to a defined schedule for the set of sensor plants to eliminate overlap between presence of different microbe sensor populations at the set of sensor plants and therefore enable identification of stressors present at the set of sensor plants based on the type of microbe sensors present in a particular microbe sensor population.

Therefore, because expression of the set of plant promoter-reporter pairs of the set of sensor plants is linked to expression of microbe reporters—rather than directly linked to presence of stressors—these plant promoter-reporter pairs can be configured to detect different stressors over time based on the type of microbe sensors present in the microbe sensor population applied to (e.g., in a region containing) the set of sensor plants.

In particular, a set of microbe sensor populations can be genetically engineered to signal a set of stressors. Each microbe sensor population, in the set of microbe sensor populations, can be configured to include a microbe promoter-reporter pair, in a set of microbe promoter-reporter pairs, configured to signal presence of a particular stressor, in the set of stressors, to the set of sensor plants. Further, each microbe promoter-reporter pair, in the set of microbe promoter-reporter pairs, can be configured to include a shared microbe reporter and a unique microbe promoter linked to the shared microbe reporter and configured to express in the presence of a particular stressor, in the set of stressors. Thus each microbe promoter-reporter pair, in the set of microbe promoter-reporter pairs, can be configured to detect a different stressor, in the set of stressors, associated with the unique microbe promoter and output a shared or common signal responsive to detecting each stressor. The set of sensor plants can be genetically engineered to include a plant promoter-reporter pair including a plant promoter configured to express in the presence of the common signal and a reporter configured to output a signal responsive to expression of the plant promoter. Thus, over time, different microbe sensor populations can be applied to the set of sensor plants to detect different stressors, in the set of stressors, based on the unique promoter contained in each microbe sensor population.

For example, a first microbe sensor population can include a first microbe promoter-reporter pair including: a first microbe promoter, in a set of microbe promoters, configured to express in the presence of a first stressor, in a set of stressors; and a first microbe reporter configured to express a microbe-reporter signal of a particular signal type—such as a fluorescence (e.g., red fluorescence, green fluorescence), pigmentation (e.g., pigmentation change), and/or chemical (e.g., expression of a particular molecule) signal—indicating expression of the first microbe promoter, thereby indicating presence of the first stressor. A second microbe sensor population can include a second microbe promoter-reporter pair including: a second microbe promoter, in the set of microbe promoters, configured to express in the presence of a second stressor, in the set of stressors; and the first microbe reporter configured to express the microbe-reporter signal, indicating expression of the second microbe promoter, thereby indicating presence of the second stressor.

In this example, the sensor plant can include a first plant promoter-reporter pair including: a plant promoter configured to express responsive to detection of the microbe-reporter signal; and a plant reporter configured to express a secondary signal indicating expression of the plant promoter.

Then, at a first time, an agronomist or a farmer may apply a first treatment including the first microbe sensor population to the set of sensor plants. During a first time period succeeding the first time, the set of sensor plants can thus detect and signal presence of the first stressor at the set of sensor plants, based on detection of the microbe-reporter signal generated by microbes in the first microbe sensor population responsive to expression of the first microbe promoter. At a second time succeeding the first time period, the farmer may apply a third treatment configured to eliminate the first microbe sensor population. Then, the farmer may apply a second treatment including the second microbe sensor population to the set of sensor plants. During a second time period succeeding the second time, the set of sensor plants can thus detect and signal presence of the second stressor at the set of sensor plants, based on detection of the microbe-reporter signal generated by microbes in the second microbe sensor population responsive to expression of the second microbe promoter.

Therefore, by decoupling expression of the plant promoter-reporter pair from presence of the stressor and rather coupling expression of the promoter-reporter pair to presence of microbe-reporter signals, a sensor plant can be configured to detect and signal presence of different stressors over time—without modifying or replacing the sensor plant—by replacing the microbe sensor population present in the agricultural field. Further, new types of microbe sensors can be generated during the crop cycle that are tailored to the agricultural field, such as based on pressures of stressors previously detected in the agricultural field.

8. Signal Detection

The computer system can detect and interpret signals (e.g., optical signals) generated by microbe sensors and/or sensor plants inhabiting the agricultural field by extracting features from images of microbe sensors and/or sensor plants that correlate to presence of particular stressors in a region including the sensor plants. More specifically, the computer system can access digital images (e.g., spectral images) of a microbe sensor(s), sensor plant(s), and/or plant canopy (e.g., sensor plants and surrounding plants) captured by one or more optical sensors (e.g., a multispectral or hyperspectral imaging device) to detect reporter signals and interpret stressors present in these sensor plants based on these reporter signals.

Figure 6:
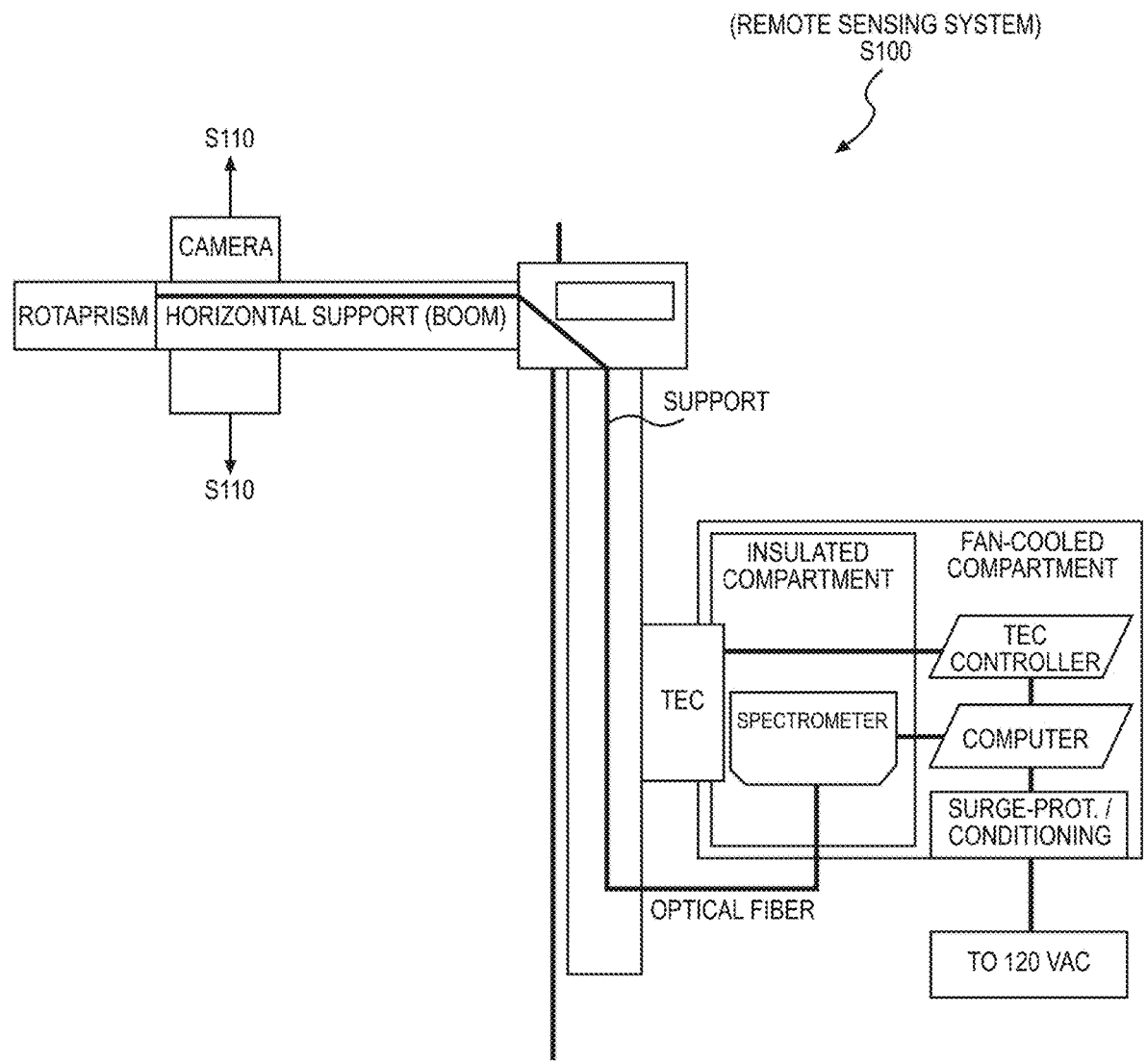
FIG. 6 is a schematic representation of one variation of the method.

In one implementation, as shown in FIG. 6, the computer system can access images of microbe sensors and/or sensor plants captured by a remote sensing system including an optical sensor, such as from a handheld camera, a handheld spectrometer, a mobile phone, a UAV, an airplane, a satellite, or from any other device that includes a high-resolution spectrometer, includes band-specific filters, or is otherwise configured to detect wavelengths of electromagnetic radiation fluorescence, luminescence, pigmentation, or any other optical signal emitted by the microbe sensor and/or sensor plant in the presence of a particular stressor.

The computer system can therefore: access images (e.g., hyperspectral) recorded by the remote sensing system (e.g., in a handheld device, in a boom or pole installed in the field, in manned or unmanned field equipment, in an aircraft, or in a satellite); extract characteristics (e.g., spectral characteristics) of these hyperspectral images; and interpret presence and/or magnitude of a particular stressor(s) present at the microbe sensor(s), sensor plant(s), crop, or fields based on correlations between characteristics extracted from these images and known signals (e.g., fluorescence, bioluminescence, pigmentation, chemical) expressed by a particular promoter-reporter pair in this microbe sensor or sensor plant.

8.1 Solar-Induced Fluorescence

In one implementation, the sensor plant can be configured to generate a plant-reporter signal of fluorescence in the electromagnetic spectrum. In particular, in this implementation, the sensor plant can be genetically-modified to include a promoter-reporter pair configured to generate a fluorescence signal responsive to presence of a particular microbe-reporter signal and/or a particular stressor at the sensor plant. For example, the sensor plant can be modified to include a promoter-reporter pair including: a promoter configured to activate in the presence of a chemical signal (e.g., production of a particular peptide) by microbe sensors present at the sensor plant; and a reporter linked to the promoter and configured to express a fluorescence signal (e.g., red-fluorescence, green-fluorescence) responsive to activation of the promoter.

In this implementation, the computer system can: access hyperspectral images—of a leaf area of a sensor plant, a whole sensor plant, a group of like sensor plants, a whole crop of sensor plants, or many fields of sensor plants— recorded by the remote sensing system (e.g., in a handheld device, in a boom or pole installed in the field, in manned or unmanned field equipment, in an aircraft, or in a satellite); extract spectral characteristics for these hyperspectral images; and interpret presence and/or magnitude of a particular stressor(s) present at the sensor plant, group of plants, crop, or fields based on correlations between spectral characteristics extracted from these hyperspectral images and known characteristics (e.g., fluorescence) expressed by a particular generic promoter-reporter pair in this sensor plant.

For example—as described in U.S. patent application Ser. No. 16/721,830, filed on 19 Dec. 2019, which is incorporated in its entirety by this reference—the computer system can access a downwelling hyperspectral image representing a downwelling light spectrum (i.e., solar radiation radiated downward onto land) and an upwelling hyperspectral image representing an upwelling light spectrum (i.e., electromagnetic radiation reflected upwardly and electromagnetic radiation fluoresced by earth, plants, and other biomass), both recorded approximately concurrently by a remote sensing system (e.g., an RGB camera, a multispectral or hyperspectral remote sensing system) configured to capture digital images (e.g., RGB images, spectral images, hyperspectral images, multispectral images) of a plant canopy, such as including exclusively sensor plants or a combination of both sensor plants and nearby non-sensing plants. The computer system can then: extract a set of downwelling and upwelling spectral characteristics from these digital images; retrieve a reporter model linking downwelling and upwelling spectral characteristics from images of the set of sensor plants to presence of a set of stressors at the set of sensor plants; and leverage the reporter model and the set of downwelling and upwelling spectral characteristics to detect a plant-reporter signal linked to expression of a particular microbe-reporter signal linked to presence of a particular stressor; and therefore interpret this detected plant-reporter signal as presence (and/or magnitude, duration) or absence of this particular stressor based on parameters in the reporter model. In particular, the computer system can detect the plant-reporter signal expressed by a plant reporter gene when triggered by a corresponding plant promoter gene, activated by a particular microbe-reporter signal expressed by a microbe reporter gene (e.g., in the microbe sensor population) when triggered by a corresponding microbe promoter gene, activated by presence of the particular stressor.

9. Stressor Prediction

The computer system can leverage features extracted from images of sensor plants and/or microbe sensors to predict presence of stressors in the environment inhabited by these sensor plants and/or microbe sensors.

In one implementation, the computer system can: access a set of images—recorded during a first time period—of a plant canopy formed by a set of sensor plants of a sensor plant type and inhabiting the environment; characterize a plant-reporter signal expressed by sensor plants, in the set of sensor plants, based on features of the set of images; access a reporter model linking features extracted from images of sensor plants of the sensor plant type to a set of stressors; and interpret a pressure of a stressor, in the set of stressors, present in the environment during the first time period based on the plant-reporter signal and the reporter model.

In one example, the computer system can access a first image depicting a downwelling light spectrum and a second image depicting an upwelling light spectrum. Then, the computer system can: estimate a nominal upwelling light spectrum—representing reflectance and fluorescence of the sensor plant in the presence of light, absent the first stressor, and at the first time—based on the downwelling light spectrum represented in the first image; extract a first intensity, at a first wavelength, in the upwelling light spectrum represented in the second image; extract a nominal intensity, at the first wavelength, in the nominal upwelling light spectrum; calculate a first deviation between the first intensity and the first nominal intensity at the first wavelength; and, in response to the first deviation exceeding a threshold deviation, predict presence of the first stressor at the sensor plant. Additionally, the computer system can: extract a second intensity, at a second wavelength, in the upwelling light spectrum represented in the second hyperspectral image; extract a second nominal intensity at the second wavelength, in the nominal upwelling light spectrum; calculate a second deviation between the second intensity and the second nominal intensity at the second wavelength; and, in response to the second deviation exceeding the threshold deviation, predict presence of the first stressor at the sensor plant. Therefore, the computer system can predict presence of a stressor at a sensor plant based on the upwelling light spectrum, the downwelling light spectrum, and the nominal upwelling light spectrum (e.g., as defined by the upwelling light model).

9.1 Reporter Model

The computer system can access a reporter model— linking plant-reporter signals extracted from images of sensor plants (e.g., extracted from images of a plant canopy formed by sensor plants) to a set of stressors in the environment inhabited by these sensor plants—to predict presence and/or pressures of stressors, in the set of stressors, in the environment.

In one implementation, the computer system can access a reporter model, in a set of reporter models, defined for a particular microbe type of microbe sensors present in the environment. In this implementation, the computer system can: access an image of a set of sensor plants inhabiting an agricultural environment and configured to express a plant-reporter signal responsive to detection of a set of microbe-reporter signals (e.g., expressed by microbe sensor populations); select a particular reporter model, from the set of reporter models, based on the microbe type of a microbe population inhabiting the agricultural environment; and predict a pressure of a first stressor, in a set of stressors, in the agricultural environment based on features extracted from the image and the selected reporter model.

For example, a set of sensor plants—inhabiting a region of an agricultural environment—of a sensor plant type can be configured to include a plant promoter-reporter pair including: a plant promoter configured to activate in the presence of a target molecule (e.g., a peptide molecule); and a plant reporter configured to activate and express a fluorescence signal responsive to activation of the plant promoter. Further, a first microbe sensor population of a first microbe type can be configured to include: a first microbe promoter configured to activate in the presence of a fungi stressor; and a microbe reporter—linked to the first microbe promoter— configured to activate and express the target molecule responsive to activation of the microbe promoter. Further, in this example, a second microbe sensor population of a second microbe type can be configured to include: a second microbe promoter configured to activate in the presence of a soil stressor (e.g., low or high soil pH, nitrogen deficiency, carbon deficiency); and the microbe reporter— linked to the second microbe promoter—configured to activate and express the target molecule responsive to activation of the first microbe promoter.

In the preceding example, during the first time period, the computer system can: access a first image—captured at a first time during the first time period—of the set of sensor plants of the sensor plant type and inhabiting the region of the agricultural environment; characterize a first fluorescence signal—expressed by the set of sensor plants—based on features extracted from the first image; and access a microbe type of a microbe sensor population present in the region of the agricultural environment during the first time period. Then, in response to the microbe type corresponding to the first microbe type—such that the first microbe sensor population inhabits the region during the first time period— the computer system can: access a first reporter model, in a set of reporter models, defined for the first microbe type and linking fluorescence signals expressed by sensor plants of the sensor plant type to pressures of the set of stressors at sensor plants in the region of agricultural environment. The computer system can then predict a first pressure of the first stressor at the set of sensor plants based on the first fluorescence signal and the first reporter model. Additionally and/or alternatively, during a second time period, the computer system can: access a second image—captured at a second time during the second time period—of the set of sensor plants; characterize a second fluorescence signal— expressed by the set of sensor plants—based on features extracted from the second image; and access a microbe type of a microbe sensor population present in the region of the agricultural environment during the second time period. Then, in response to the microbe type corresponding to the second microbe type—such that the second microbe sensor population inhabits the region during the second time period—the computer system can: access a second reporter model, in the set of reporter models, defined for the second microbe type and linking fluorescence signals expressed by sensor plants of the sensor plant type to pressures of the set of stressors at sensor plants in the region of agricultural environment. The computer system can then predict a second pressure of the second stressor at the set of sensor plants based on the second fluorescence signal and the second reporter model.

In the preceding implementation, the computer system can access a reporter model configured to: link features extracted from images of a set of sensor plants, inhabiting an environment, to a microbe-reporter signal, in a set of microbe-reporter signals, present in the environment; and link this microbe-reporter signal to a particular stressor, in the set of stressors, present in the environment, such as based on a microbe type of a microbe sensor population present in the environment. For example, the reporter model can define: a plant-reporter model configured to link features extracted from images of a set of sensor plants, of a sensor plant type, to a set of microbe-reporter signals; and a set of microbe-reporter models configured to link the set of microbe-reporter signals to the set of stressors in the environment. In particular, in this example, the reporter model can define: a first correlation linking plant-reporter signals, expressed by sensor plants of a sensor plant type, to presence of a set of microbe-reporter signals; and a second correlation linking microbe-reporter signals, in the set of microbe-reporter signals, expressed by microbe sensors of a microbe type, to pressures of the set of stressors.

In particular, in the preceding example, the computer system can: access the first image; characterize the first fluorescence signal based on features extracted from the first image, such as characterized by fluorescence within a particular wavelength range and at a particular intensity; and predict a first magnitude of a first microbe-reporter signal— corresponding to production of the target molecule by microbe sensors in the first microbe sensor population— based on the plant-reporter model and the first fluorescence signal. Then, the computer system can: access a first microbe-reporter model, in the set of microbe-reporter models, defined for microbe sensors of the first microbe type and linking microbe-reporter signals expressed by microbe sensors of the first microbe type to the set of stressors in the environment; and predict the first pressure of the first stressor in the environment, during the first time period, based on the first magnitude of the first microbe-reporter signal and the first microbe-reporter model.

The computer system can therefore: characterize a plant-reporter signal (e.g., a fluorescence signal, a bioluminescence signal, a pigmentation signal)—expressed by a set of sensor plants inhabiting an environment—based on features extracted from one or more images of the set of sensor plants; convert this plant-reporter signal to a microbe-reporter signal—such as of a particular intensity or magnitude—based on a plant-reporter model defined for sensor plants of the sensor plant type; and predict a pressure (e.g., presence, magnitude, measurement) of a particular stressor in the environment based on the predicted microbe-reporter signal and a particular microbe-reporter model defined for microbe sensors of a particular microbe type present in the environment.

9.2 Crop Management: Reporting

In one implementation, the computer system can generate real-time prompts or treatment decisions for an agricultural environment—such as for crops grown in this agricultural environment—in order to increase efficiency of crop treatments and maintenance over time and maintain or increase yield from the agricultural environment.

For example, in response to interpreting a pressure of a particular stressor—exceeding a threshold pressure—in a region of the agricultural environment including a set of sensor plants, the computer system can generate a prompt to address the particular stressor in plants proximal the set of sensor plants. More specifically, the computer system can: select a first mitigation action, in a set of mitigation actions defined for sensor plants, configured to mitigate the pressure of the particular stressor; generate a prompt to execute the first mitigation action; and transmit the prompt to a user (e.g., to a computing device associated with the user) affiliated with the agricultural environment. The computer system can therefore regularly update users (e.g., agronomists, farmers, field owners) regarding changes in crop health and/or suggest treatments for mitigating pressures of stressors in plants.

Additionally, in one implementation, as more data is collected and various treatments are applied to the crop over time, the computer system can develop and/or refine models to predict responses of plants and plant stressors to certain treatments, such as a magnitude change in signal output by a sensor plant for a known stressor responsive to a particular magnitude of treatment applied to the field.

10. Variation: Direct Detection of Microbe Signals

In one variation, a microbe sensor population can be deployed to an agricultural field—such as via an irrigation system installed in the agricultural field or as a coating for seeds or seedlings planted in the agricultural field—for direct detection and signaling of stressors (e.g., abiotic and/or biotic stressors) present in the agricultural field, such as independently of any sensor plants present in the agricultural field. An optical sensor can thus record images—depicting optical signals (e.g., microbe-reporter signals) expressed directly by the microbe sensor population—of this microbe sensor population in the agricultural field. The computer system can then leverage known correlations (e.g., stored in a reporter model) between optical signals in these images—expressed by microbe sensors in the microbe sensor population—and pressures (e.g., presence and/or magnitude) of stressors in the agricultural field to interpret a pressure of a stressor (e.g., a plant stressor, a soil stressor, an environmental stressor)—such as a pollutant (e.g., a foreign contaminant), pest, disease, soil pH, nitrogen, or nutrient deficiency in regions of the agricultural field based on these correlations and optical signals expressed directly by the microbe sensor population and depicted in the images.

In particular, in this variation, a population of microbe sensors can be modified to express detectable signals (e.g., optical signals) responsive to detection of a set of stressors (e.g., abiotic and/or biotic stressors, environmental conditions) present in an agricultural field inhabited by the population of microbe sensors. In particular, as described above, a population of microbes—such as bacteria or fungi—can be genetically engineered to form a population of microbe sensors including a set of microbe promoter-reporter pairs configured to signal pressures of a set of stressors, each microbe promoter-reporter pair including: a microbe promoter linked to a particular stressor, in the set of stressors; and a microbe reporter configured to express a reporter signal responsive to expression of the microbe promoter. For example, a microbe sensor can include a first microbe promoter-reporter pair including: a first promoter configured to express responsive to detection of a first stressor (e.g., low or high soil pH levels, low or high nitrogen levels in the soil, parasites, pathogens, insects, fungi, dehydration, oils, radioactivity, low soil carbon content); and a first microbe reporter configured to express a first microbe-reporter signal (e.g., a fluorescence signal, a bioluminescence signal, a pigmentation signal, a chemical signal) responsive to expression of the first microbe promoter.

In one implementation, a population of these microbe sensors can be deployed to an agricultural field—such as via an irrigation system installed in the agricultural field or as a coating for seeds or seedlings planted in the agricultural field—to detect stressors (e.g., abiotic and/or biotic stressors) present in the agricultural field. An optical sensor can then record images—depicting optical signals expressed by the population of microbe sensors—of this population of microbe sensors in the agricultural field. A computer system can then implement the methods and techniques described above to leverage known correlations (e.g., stored in a reporter model) between optical signals in these images and pressures (e.g., presence and/or magnitude) of stressors in the agricultural field to interpret a pressure of a stressor (e.g., a plant stressor, a soil stressor, an environmental stressor)—such as a pollutant (e.g., a foreign contaminant), pest, disease, soil pH, nitrogen, or nutrient deficiency in regions of the agricultural field based on these correlations and optical signals depicted in the images. In particular, the computer system can leverage a particular reporter model, in a set of reporter models, defined for a particular microbe type—linking microbe-reporter signals extracted from images of microbe sensors (e.g., deployed in an environment) of a particular microbe type to a set of stressors in the environment inhabited by these sensor plants—to predict presence and/or pressures of stressors, in the set of stressors, in the environment.

10.1 Crop Cycle: Stressor Monitoring and Management

Microbe sensor populations present in an agricultural field can be configured to monitor pressures of stressors (e.g., presence and/or magnitude of stressors) within the agricultural field at each stage of a crop cycle (e.g., for a particular crop assigned to the agricultural field), such as before, during, and/or after growing of a particular crop within the agricultural field.

10.1.1 Crop Preparation: Pre-Planting

In one implementation, these microbe sensors can be deployed to the agricultural field before planting of crops— such as between regular crop rotations—to monitor conditions of the agricultural field and therefore enable improvement of these conditions in preparation for planting of crops within the agricultural field.

In particular, during a crop preparation period for an agricultural field—such as preceding planting of plant seeds or seedlings within the agricultural field—a microbe sensor population can be applied to the agricultural field (e.g., a region of a crop, an entire crop) to detect presence of stressors within the agricultural field. The microbe sensor population can be configured to signal detection of a set of stressors (e.g., plant, soil, and/or environmental stressors)—such as presence of soil pests (e.g., nematodes), presence of fungi, low or high nitrogen levels in the soil, low or high soil pH levels, levels of organic matter in the soil—in the agricultural environment. The computer system can then leverage these signals output by the microbe sensor population to interpret presence and/or magnitude of a particular stressor, in the set of stressors, in the agricultural environment.

For example, a microbe sensor population (e.g., a genome of a microbe sensor population) can be genetically modified to: express a first microbe-reporter signal (e.g., a red-fluorescent signal) corresponding to a magnitude of an insect pressure; express a second microbe-reporter signal (e.g., a green-fluorescent signal) corresponding to a magnitude of a nitrogen pressure (e.g., deficiency of nitrogen in the soil); and/or express a third microbe-reporter signal (e.g., a yellow-fluorescent signal) corresponding to a soil pH pressure (e.g., a low or high soil pH level). In particular, the microbe sensor population can include: a first subpopulation of microbe sensors of a first microbe type configured to express the first microbe-reporter signal responsive to detection of the insect pressure; a second subpopulation of microbe sensors of a second microbe type configured to express the second microbe-reporter signal responsive to detection of the nitrogen pressure; and a third subpopulation of microbe sensors of a third type configured to express the third microbe-reporter signal responsive to detection of the soil pH pressure. Alternatively, in another example, the population of microbes can include microbe sensors of a single type configured to express the first, second, and/or third microbe-reporter signal(s) responsive to detection of the insect, nitrogen, and/or soil pH pressure(s), respectively.

This microbe sensor population can then be sprayed (e.g., via an irrigation system) across a region of the agricultural field during a crop preparation period for a crop grown within the agricultural field. The computer system can then: access images of the region of the crop recorded during the crop preparation period; extract features from these images; and interpret presence and/or magnitude of the insect pressure, the nitrogen pressure, and the pH pressure based on the first, second, and third microbe-reporter signals expressed by microbe sensors in the microbe sensor population.

Further, the computer system can identify particular regions within the agricultural field associated with particular stressors in the set of stressors. In particular, in the preceding example, the computer system can: identify a subregion of the agricultural field (e.g., along an edge of the agricultural field bordering a neighboring agricultural field, proximal a creek) experiencing insect pressures based on a magnitude of the first microbe-reporter signal (e.g., an intensity of the red-fluorescent signal) expressed by microbe sensors located in the subregion of the agricultural field; identify a subregion of the agricultural field experiencing nitrogen pressures (e.g., nitrogen deficiency); and/or identify a subregion of the agricultural field experiencing soil pH pressures (e.g., abnormal soil pH levels).

The computer system can then leverage this information to inform crop management—such as fertilizing, irrigating, and/or treating of soil and plants in the agricultural field and/or planting of seeds or seedlings within specific regions of the agricultural field—throughout a remainder of a crop cycle for this agricultural field. In particular, the computer system can predict and/or suggest agricultural products and/or treatment best suited for this agricultural field, a particular region of this agricultural field, and/or for a type of crop designated for this agricultural field. For example, the computer system can suggest: a type of seed hybrid to plant in the agricultural field; a blend of soil to lay; a particular nitrogen amendment configured to treat nitrogen pressures in the soil (e.g., in a particular region of the agricultural field and/or across the agricultural field); a particular pH amendment configured to treat soil pH pressures in the soil; etc. Further, the computer system can provide recommendations related to deployment of sensor plants in the agricultural field. For example, the computer system can suggest: a type or types of sensor plants for deploying in the agricultural field; and/or a particular configuration (e.g., distribution within the agricultural field) for deploying sensor plants within the agricultural field.

Therefore, by applying the microbe sensor population to the agricultural field prior to planting of crops within the agricultural field, the computer system can: extract insights regarding types and/or magnitudes of stressor pressures within the agricultural field during the crop preparation period; leverage these insights to better prepare the agricultural field for planting of seedlings or seeds, such as by providing treatment suggestions to a farmer or agronomist associated with the agricultural field, in order to minimize interference of stressors in plant growth and achieve a higher crop yield; and leverage these insights to predict types and/or magnitudes of stressor pressures (e.g., which may be likely to reoccur) in the agricultural field and/or in specific regions of the agricultural field throughout a remainder of the crop cycle, such as after planting of seedlings or seeds, in order to quickly detect and treat stressors detected within the agricultural field during the crop cycle.

10.1.1.1 Crop Model

Additionally, during the crop preparation period, the computer system can identify trends in growth and/or spread of pressures of stressors within the agricultural field. The computer system can then leverage these trends to predict changes in pressures of stressors throughout the crop cycle, such as during a growing period succeeding the crop preparation period.

For example, a microbe sensor population (e.g., a genome of a microbe sensor population) can be genetically modified to express a microbe-reporter signal (e.g., a red-fluorescent signal) corresponding to pressure of an insect stressor. The computer system can: access an image of a first region of the agricultural field (e.g., recorded by various fixed or mobile, local or remote sensors) containing a first portion of the microbe sensor population; extract features (e.g., intensity of the fluorescent signal at a target wavelength or wavelengths)—corresponding to the first-microbe-reporter signal—from this image of the first region of the agricultural field; and estimate a pressure (e.g., presence and/or magnitude) of the insect stressor in the first region of the agricultural field based on these features depicted in the first image. In this example, the computer system can: repeat this process to extract features from other regions of this same image or other concurrent images depicting other regions of the agricultural field containing other portions of the microbe sensor population; estimate pressures of the insect stressor in these other regions of the agricultural field based on features depicted in these regions of the image and/or from other concurrent images of the field; and interpolate or extrapolate an insect pressure gradient across the entire agricultural field based on locations and pressures of insect stressors indicated in these portions of the microbe sensor population distributed throughout the field.

Furthermore, the computer system can: repeat this process over time to estimate pressures of insect stressors or insect pressure gradients in a region or across the entirety of the agricultural field; extrapolate future pressures of insect stressors in the field based on the region-specific or field-wide insect pressures thus derived from sequential images of microbe sensors and/or sensor plants occupying the agricultural field, such as during a growing period succeeding the crop preparation period; and then prompt a field operator to preemptively address predicted future changes in pressures of insects in particular regions of the agricultural field well before a change in pressure of the insect stressor (substantively) affects crop yield from this agricultural field.

10.1.1.2 Effectiveness of Crop Treatments

The computer system can leverage detected changes in pressures of stressors over time to identify effective treatments (or "mitigation actions") for reducing pressures of particular stressors within regions of the agricultural field. In particular, during the crop preparation period, the computer system can: suggest different mitigation actions to the user for treating pressures of various magnitude, location, and/or types of stressors within the agricultural field; and confirm efficacy of these mitigation actions for each different pressure detected in the agricultural field during the crop preparation period, based on changes in signals expressed by the microbe sensor population.

For example, during the crop preparation period, the computer system can: access a first image, recorded at a first time, of a first microbe sensor population inhabiting the agricultural field and configured to signal pressures of a first stressor in the agricultural field; access a microbe reporter model linking features extracted from images of microbe sensors in the first microbe sensor population to the first stressor based on signals expressed by microbe sensors in the first microbe sensor population; interpret a first pressure of the first stressor within a first region of the agricultural field based on the microbe reporter model and features extracted from the first image; and, in response to the first pressure exceeding a threshold pressure defined for the first stressor, prompt a user (e.g., field operator) affiliated with the agricultural field to implement a first mitigation action, in a set of mitigation actions, linked to the first stressor.

Later, during the crop preparation period, the computer system can: access a second image, recorded at a second time succeeding the first time, of the first microbe sensor population inhabiting the agricultural field; interpret a second pressure of the first stressor within the first region of the agricultural field based on the microbe reporter model and features extracted from the second image; characterize a difference between the first pressure of the first stressor and the second pressure of the first stressor in in the first region of the agricultural field; and, in response to the difference exceeding a threshold difference, confirm efficacy of the first mitigation action in the agricultural field for treating the first stressor.

The computer system can therefore assess efficacy of various mitigation actions—for different pressures (e.g., presence and/or magnitudes) of different stressors—within the agricultural field during the crop preparation period, rather than during the growing period for crops planted in the agricultural field. By evaluating efficacy of these mitigation actions during the crop preparation period, the computer system can: identify types of mitigation actions (i.e., treatments) that are effective in treating or regulating particular stressors in this agricultural field prior to planting of crops in the agricultural field, thereby minimizing risk associated with crop loss during evaluation of mitigation actions; and enable rapid implementation of the most effective mitigation actions responsive to detection of stressors in crops during the growing period, thereby minimizing losses to crop yield due to implementation of less effective mitigation actions when stressors are detected.

10.1.2 Growing Period

Additionally and/or alternatively, in another implementation, these microbe sensors can be deployed after planting of crops and/or concurrently in order to enable early detection of pressures of stressors in the agricultural field that may negatively impact plant growth and/or overall crop yield. In particular, microbe sensors present in the agricultural field can cooperate with sensor plants—genetically engineered to express detectable signals (e.g., optical signals) responsive to detection of stressors in the agricultural field—growing in the agricultural field to detect stressors—such as pollutants, parasites, nutrient deficiency, low soil carbon content—in the agricultural field.

These sensor plants can be similarly genetically engineered to include a set of plant promoter-reporter pairs configured to signal pressures of a set of stressors—distinct or equivalent stressors detectable by microbe sensors in the agricultural field—each plant promoter-reporter pair including: a plant promoter linked to a particular stressor; and a plant reporter configured to express a plant-reporter signal responsive to expression of the plant promoter. As a plant canopy formed by plants in the agricultural field continues to grow, thereby concealing a proportion of microbe-reporter signals generated by microbe sensors in the agricultural field, the computer system can leverage plant-reporter signals—independently and/or in combination with microbe-reporter signals—to detect pressures of stressors within the agricultural field. Microbe sensor populations can be applied (e.g., via spraying) to the agricultural field to enable detection of these stressors by the sensor plants—such as by coupling expression of the plant promoter to expression of the microbe-reporter signal—and/or to enable detection of other types of stressors (e.g., pollutants, soil carbon content) undetectable by sensor plants.

10.1.2.1 Growing Period: Small Plant Canopy

In particular, upon planting of a crop—including sensor plants (e.g., sensor plant seeds or seedlings)—microbe sensors applied to the agricultural field can continue detecting and signaling pressures of stressors within the agricultural field. For example, during a growing period, in response to a plant canopy of plants in the agricultural field falling below a threshold density—such that microbe-reporter signals generated by microbe sensors are detectable (e.g., via images recorded from above the plant canopy), the computer system can continue to access images of microbe sensors present in the agricultural field to interpret pressures of the stressors within the agricultural field.

In one implementation, microbe sensors present and/or applied to the agricultural field during the growing period can be configured to detect a distinct set of stressors from microbe sensors applied to the agricultural field during the crop preparation period. For example, these microbe sensors can be configured to detect stressors unique to presence of plants in the agricultural field.

As plants in the agricultural field continue to grow and the plant canopy increases in size—therefore partially concealing microbe-reporter signals expressed by microbe sensors present in the agricultural field—the computer system can additionally access images of sensor plants—configured to signal and detect pressures of stressors—present in the agricultural field to interpret pressures of stressors within the agricultural field. In one implementation, microbe sensors present in the agricultural field can be configured to signal presence of distinct stressors from sensor plants present in the agricultural field, such that the computer system can monitor a larger quantity of stressors in the agricultural field. Alternatively, in another implementation, microbe sensors present in the agricultural field can be configured signal presence of the same stressors as sensor plants present in the agricultural field, thereby increasing a magnitude of the detectable signal (e.g., a combination of the microbe-reporter signal and the plant-reporter signal).

Further, the computer system can leverage insights gained during the crop preparation period to predict pressures of stressors within the agricultural field and/or to suggest mitigation actions responsive to detecting or predicting pressures of stressors within the agricultural field. For example, the computer system can leverage correlations (or a "crop model") derived during the crop preparation period to predict pressures of stressors in various regions of the agricultural field. In particular, in this example, during the crop preparation period, the computer system can derive a correlation between pressures of a first stressor in a first region of the agricultural field and pressures of a second stressor in a second region of the agricultural field based on images of microbe sensors present in the first and second regions of the agricultural field during the crop preparation period. Later, during the growing period succeeding the crop preparation period, the computer system can: access an image of a set of sensor plants inhabiting the first region of the agricultural field and genetically modified to include a first plant promoter-reporter pair configured to signal pressures of the first stressor in the agricultural field; access a plant reporter model linking features extracted from images of sensor plants to the set of stressors based on signals expressed by the first plant promoter-reporter pair; and interpret a first pressure of the first stressor within the first region of the agricultural field based on the plant reporter model and features extracted from the image. Then, the computer system can predict a second pressure of the first stressor in the second region of the agricultural field based on the first pressure and the correlation. The computer system can then suggest a set of intervention actions for treating the first and second pressures of the first stressor—such as a combination of intervention actions exhibiting a high efficacy rate for treating pressures of the first stressor during the crop preparation period—to a crop manager associated with the agricultural field.

10.1.2.2 Growing Period: Full Plant Canopy

Once the plant canopy, formed by plants in the agricultural field, reaches a threshold canopy density—such that the plant canopy covers a significant proportion of the agricultural field—the computer system can leverage plant-reporter signals, expressed by sensor plants inhabiting the agricultural field, to detect pressures of stressors within the agricultural field during the growing period. Microbe sensor populations can be applied to the agricultural field to enable detection of these stressors by the sensor plants and/or detection of other stressors undetectable by sensor plants.

In one implementation, the set of sensor plants can be configured to directly detect and signal pressures of a first set of stressors. Additionally, in this implementation, the microbe sensor population can be configured to directly detect and signal a second set of stressors distinct from the first set of stressors. For example, the set of sensor plants can be configured to detect pressures of the first set of stressors (e.g., plant stressors) such as: insect stressors, fungi stressors, nutrient stressors, water stressors (e.g., dehydration, overhydration), pH stressors, etc. Alternatively, the microbe sensor population can be configured to detect pressures of the second set of stressors (e.g., environmental stressors) such as radioactivity and/or small molecule contaminants in the soil or ground (e.g., oil).

In this example, the computer system can: access a first image of the agricultural field, such as recorded by a sensor installed in the agricultural field or on aerial vehicle; extract a first set of features—corresponding to a plant-reporter signal—from this first image of the agricultural field; and estimate a first pressure (e.g., presence and/or magnitude) of a first stressor, in the first set of stressors, in the agricultural field based on the first set of features depicted in the first image. Further, the computer system can: access the first image or a concurrent image of the agricultural field; extract a second set of features—corresponding to a microbe-reporter signal—from this first or concurrent image of the agricultural field; and estimate a second pressure (e.g., presence and/or magnitude) of a second stressor, in the second set of stressors, in the agricultural field based on the second set of features depicted in the first or concurrent image. In this example, because the plant canopy may substantially conceal the microbe-reporter signal (e.g., based on an aerial view of the crop), the computer system can prompt a field operator to manually record an image of a region of the agricultural field (e.g., including microbe sensors)—below the plant canopy—such as with a handheld camera, a handheld spectrometer, and/or a mobile phone.

Alternatively, in another implementation, the set of sensor plants can be configured to signal detection of microbe-reporter signals (e.g., chemical signals) expressed by microbe sensors present in the agricultural field, responsive to detection of stressors by these microbe sensors. In this implementation, the set of sensor plants can include a plant promoter-reporter pair configured to activate responsive to activation of a corresponding microbe promoter-reporter pair of the microbe sensor population. In particular, the microbe sensor population can be configured to: detect a set of stressors; and express a microbe-reporter signal (e.g., a chemical signal) representing detection of a stressor in the set of stressors. The set of sensor plants can be configured to: detect the microbe-reporter signal expressed by the microbe sensor population; and express a corresponding plant-reporter signal representing detection of the microbe-reporter signal and therefore detection of the stressor. The computer system can then: access an image of the agricultural field; extract features (e.g., magnitude of the plant-reporter signal) from this image of the agricultural field; and estimate a pressure (e.g., presence and/or magnitude) of the stressor in the agricultural field based on these features depicted in the image.

In this implementation, by coupling expression of the plant promoter-reporter pair to expression of the microbe promoter-reporter pair, sensor plants can be configured to signal pressures (e.g., presence and/or magnitude) of a wide range of stressors—such as plant stressors, soil stressors, and/or environmental stressors—within the agricultural field based on modifications (e.g., genetic modifications) to microbe reporters applied to this agricultural field.

In each of these implementations, the computer system can generate real-time prompts or treatment suggestions for crops in order to increase efficiency (e.g., effectiveness, time, and cost) of crop treatment and maintenance and/or increase crop yield from the agricultural field. For example, in response to interpreting a pressure of a particular stressor in the agricultural field, the computer system can: generate a prompt to address the particular stressor in plants proximal the pressure of the particular stressor within the agricultural field; and transmit this prompt (e.g., via text message, email, push notification) to a field operator (e.g., farmer, agronomist) associated with the agricultural field. In particular, in this example, the computer system can: select a first mitigation action, in a set of mitigation actions, associated with mitigation of the particular stressor; generate a prompt to execute the first mitigation action, such as dispensing a particular amount of a particular fungicide at a particular frequency for treating a pressure of a fungi stressor; and transmit this prompt to the field operator.

10.1.3 Post-Harvest

Additionally and/or alternatively, in another implementation, after harvesting of crops, a microbe sensor population can be applied to the region of the agricultural field to enable assessment of soil characteristics. In particular, the computer system can interpret a set of soil characteristics—such as annually during post-harvest period—to characterize changes in these soil characteristics over time and suggest interventions (e.g., acute or long-term treatments and/or modifications to current agricultural techniques) that may yield improvements to soil characteristics over time.

For example, a microbe sensor population can be modified to express an optical signal linked to soil carbon content. In particular, the microbe sensor population can be configured to: express the optical signal at intensities within a first intensity range in response to detecting soil carbon contents within a first carbon content range; express the optical signal at intensities within a second intensity range—intensities within the second intensity range exceeding intensities within the first intensity range—in response to detecting soil carbon contents within a second carbon content range exceeding the first carbon content range; and express the optical signal at intensities within a third intensity range— intensities within the third intensity range exceeding intensities within the second intensity range—in response to detecting soil carbon contents within a third carbon content range exceeding the second carbon content range.

In this example, this microbe sensor population can be deployed (e.g., via a tractor) to an agricultural field after harvesting of the crops in the agricultural field. The computer system can then: access a first image, recorded at a first time, of the microbe sensor population inhabiting the particular region; access a microbe reporter model linking intensities of optical signals extracted from images of microbe sensors to soil carbon content; and, in response to interpreting a first intensity, within the first intensity range, of the optical signal, interpret a low soil carbon content during this post-harvest period. The computer system can then suggest a set of interventions—such as during this post-harvest period, during a next crop-preparation period, and/or during a next growth period—configured to increase carbon sequestration capacity of the soil and thereby increase the soil carbon content in the agricultural field. The computer system can repeat this process each succeeding post-harvest period to identify interventions that may yield—globally and/or for this particular agricultural field— increased soil carbon sequestration and/or soil carbon content, thereby enabling improvements to soil health and/or plants inhabiting this agricultural field, and/or increased global carbon sequestration.

10.2 Variation: Environmental Analysis

In one variation, a microbe sensor population can be modified to signal a set of environmental conditions in an environment—such as not limited to an agricultural environment—inhabited by the microbe sensor population. For example, microbe sensor populations can be deployed to regions associated with mining, forestry, waste-water treatment, and/or agriculture. The computer system can then detect and interpret signals generated by microbe sensors in these regions to characterize (or "measure") environmental conditions in these regions.

10.2.1 Soil Analysis

In one implementation, a microbe sensor population can be modified to signal a set of soil characteristics—such as mineral content, pollutants, gas emissions, pH, carbon content, and/or total organic matter content—detected in a plot of soil in a particular region. The computer system can detect and interpret signals generated by the microbe sensor population by extracting features from images of microbe sensors in the particular region that correlate to soil characteristics of soil in this particular region (e.g., in the plot of soil).

For example, microbe sensor populations can be deployed to regions associated with mining, forestry, and/or agriculture. The computer system can then detect and interpret signals generated by microbe sensors in these regions to characterize (or "measure") soil characteristics in these regions.

In one example, a microbe sensor population can be deployed to a mining site during a remediation period to characterize (or "measure") presence and/or magnitude of toxic compounds in the soil. In this example, the microbe sensor population can be configured to express a set of microbe-reporter signals, each microbe-reporter signal, in the set of microbe-reporter signals, associated with a particular compound, in a set of toxic compounds. The computer system can then: access an image, recorded during the remediation period, of the microbe sensor population inhabiting the mining site; access a microbe reporter model linking intensities of microbe-reporter signals extracted from images of microbe sensors to the set of toxic compounds; and interpret a set of measured concentrations of the set of toxic compounds, present in soil in the mining site, based on the set of microbe-reporter signals and the reporter model. Additionally, in this example, the computer system can: access a set of target concentrations of the set of toxic compounds; characterize a set of differences between the set of measured concentrations and the set of target concentrations, each difference, in the set of differences, corresponding to a particular toxic compound, in the set of toxic compounds; generate a report including the set of differences between measured concentration and target concentration for each toxic compound in the set of toxic compounds; and transmit this report to a user (or users) associated with the mining site.

In another example, a microbe sensor population can be deployed to an agricultural field during a post-harvest period to characterize (or "measure") soil carbon content. In this example, the microbe sensor population can be configured to express a microbe-reporter signal (e.g., a detectable signal) representing a magnitude (e.g., amount, proportion, concentration) of carbon present in the soil. The computer system can then: access an image, recorded during the post-harvest period, of the microbe sensor population inhabiting the agricultural field; access a microbe reporter model linking intensity of the microbe-reporter signal, extracted from images of microbe sensors, to soil carbon content; and interpret a concentration of carbon present in the soil in the agricultural field based on the microbe-reporter signal and the reporter model. Additionally, in this example, the computer system can: generate a report including the concentration of carbon present in soil in the agricultural field; and transmit this report to a user (or users) associated with the agricultural field.

Additionally, in this variation, the computer system can: track soil characteristics over time; interpret changes in soil characteristics over time; and suggest interventions—such as acute or long-term treatments and/or modifications to current operating techniques—that may yield improvements to soil health, local eco-system health (e.g., for a natural and/or managed ecosystem), and/or global environmental health (e.g., via increased carbon sequestration in soil).

For example, a microbe sensor population can be modified to include: a first subpopulation of microbe sensors configured to express a red-fluorescence signal associated with soil pH; a second subpopulation of microbe sensor configured to express a green-fluorescence signal associated with mineral composition; and third subpopulation microbe sensor configured to express a yellow-fluorescence signal associated with carbon content. This microbe sensor population can then be applied to soil in a particular region (e.g., a region requiring soil restoration). The computer system can then: access a first image, recorded at a first time, of the microbe sensor population inhabiting the particular region; access a microbe reporter model linking intensities of fluorescence signals extracted from images of microbe sensors to the set of soil characteristics; interpret an initial soil pH based on a first intensity of the red-fluorescence signal; interpret an initial mineral composition of the soil based on a second intensity of the green-fluorescence signal; and interpret an initial carbon content in the soil based on a third intensity of the yellow-fluorescence signal. The computer system can then suggest a set of interventions (e.g., to a user or users associated with management of this particular region) based on the initial soil pH, the initial mineral composition, and the initial carbon content.

After implementation of this set of interventions (e.g., for a particular period of time), the computer system can: access a second image, recorded at a second time, of the microbe sensor population; interpret a new soil pH based on a fourth intensity of the red-fluorescence signal; interpret a new mineral composition of the soil based on a fifth intensity of the green-fluorescence signal; and interpret a new carbon content in the soil based on a sixth intensity of the yellow-fluorescence signal. The computer system can then characterize changes in the soil pH, mineral composition, and carbon content and link these changes to the set of interventions applied to this particular region. The computer system can continue suggesting interventions over time to improve soil health in this particular region and/or environmental health more generally.

10.2.2 Variation: Waste-Water Analysis

In one implementation, a microbe sensor population can be modified to signal a set of water characteristics—such as viral load, mineral content, pollutants, etc.—detected in a volume of water. The computer system can then detect and interpret signals generated by the microbe sensor population by extracting features from images of microbe sensors in the volume of water that correlate characteristics of water in this volume of water and/or in a greater region containing the volume of water.

In one example, a microbe sensor population can be deployed to a waste-water reservoir containing waste water collected from a particular region. In this example, the microbe sensor population can be configured to express a set of microbe-reporter signals, each microbe-reporter signal, in the set of microbe-reporter signals, associated with a particular pathogen (e.g., bacteria, virus) in a set of pathogens. For example, the microbe sensor population can be modified to include: a first promoter-reporter pair configured to express a first microbe-reporter signal (e.g., fluorescence, pigmentation, chemical), in the set of microbe-reporter signals, representing a first pathogen load of a first virus (e.g., coronavirus, influenza), in the set of pathogens, in the waste-water reservoir; a second promoter-reporter pair configured to express a second microbe-reporter signal), in the set of microbe-reporter signals, representing a second pathogen load of a second virus, in the set of pathogens, in the waste-water reservoir; and a third promoter-reporter pair configured to express a third microbe-reporter signal), in the set of microbe-reporter signals, representing a third pathogen load of a bacteria (e.g., *salmonella, streptococcus, E. Coli*), in the set of pathogens, in the waste-water reservoir.

The computer system can then: access an image of the microbe sensor population inhabiting the waste-water reservoir; access a microbe reporter model linking intensities of microbe-reporter signals extracted from images of microbe sensors to pathogen loads of the set of pathogens; and interpret a set of pathogen loads—including the first, second, and third pathogen loads—of the set of pathogens, present in water in the waste-water reservoir, based on the set of microbe-reporter signals and the reporter model. Further, the computer system can: access a regional model corresponding to the region containing the waste-water reservoir and linking pathogen loads in waste-water to prevalence of pathogens within the region; and predict regional prevalence of the first virus, the second virus, and the bacteria in the region based on the regional model and the first, second, and third pathogen loads.

Additionally and/or alternatively, in this example, the computer system can: access a set of threshold pathogen loads defined for the set of pathogens; flag each pathogen, in the set of pathogens, corresponding to a pathogen load exceeding a threshold pathogen load, in the set of threshold pathogen loads, defined for the pathogen; and generate a report including the set of pathogen loads and indicating detection of unhealthy pathogen loads for each flagged pathogen in the set of pathogens.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for identifying stressors in an agricultural environment comprising:
    during a first time period:
        accessing a first spectral image of a set of sensor plants in an agricultural environment, wherein the sensor plants are configured to detect microbe-reporter signals expressed by a population of microbe sensors present in the agricultural environment, the first spectral image captured during the first time period;
        characterizing a first plant-reporter-signal expressed by sensor plants based on features extracted from the first spectral image;
        identifying a first microbe type and a first stressor associated with the first microbe-reporter signal produced by the microbe sensors; and
        based on the identified microbe type generating the first microbe-reporter signal in response to pressures of a first stressor:
            accessing a first reporter model linking the first plant-reporter signal expressed by the sensor plants to pressures of the first stressor; and
            based on the first reporter model and the first plant-reporter signal, interpreting a first pressure of the first stressor in the agricultural environment; and
    during a second time period succeeding the first time period:
        accessing a second spectral image of the set of sensor plants recorded during the second time period;
        characterizing a second plant-reporter-signal expressed by sensor plants based on features extracted from the second image;
        identifying a second microbe type associated with a second microbe-reporter signal produced by a second population of microbe sensors present in the agricultural environment during the second time period; and
        based on the identified microbe type generating the second microbe-reporter signal in response to pressures of a second stressor:
            accessing a second reporter model linking the second plant-reporter signal expressed by the sensor plants to pressures of the second stressor; and
            based on the second reporter model and the second plant-reporter signal, interpreting a second pressure of the second stressor in the agricultural environment,
    wherein the first spectral image and the second spectral image are captured by an optical sensor.

2. The method of claim 1, further comprising, during the first time period, in response to the first pressure of the first stressor exceeding a threshold pressure defined for the first stressor:
    selecting a first mitigation action configured to mitigate the first pressure of the first stressor;
    generating a prompt to execute the first mitigation action; and
    transmitting the prompt to a user affiliated with the agricultural environment.

3. The method of claim 1, further comprising:
    during an initial time period preceding the first time period, genetically modifying the first population of microbe sensors to include a first microbe promoter-reporter pair configured to signal pressures of the first stressor in the first population of microbe sensors; and
    during the first time period, genetically modifying the second population of microbe sensors to include a second microbe promoter-reporter pair configured to signal pressures of the second stressor in the second population of microbe sensors.

4. The method of claim 3:
    wherein the first microbe promoter-reporter pair in the first population of genetically modified microbe sensors comprises:
        a first microbe promoter configured to activate based on presence of the first stressor; and
        a microbe reporter linked to the first microbe promoter and configured to express a first microbe-reporter signal, representing presence of the first stressor, responsive to expression of the first microbe promoter;
    the second microbe promoter-reporter pair in the second population of genetically modified microbe sensors comprises:
        a second microbe promoter configured to activate based on presence of the second stressor; and
        a second microbe reporter linked to the second microbe promoter and configured to express a second microbe-reporter signal, representing presence of the second stressor, responsive to expression of the second microbe promoter.

5. The method of claim 1:
    wherein interpreting the first pressure of the first stressor based on the first reporter model and the first plant-reporter signal comprises interpreting the first pressure of the first stressor, comprising a soil contaminant, based on the first reporter model and the first plant-reporter signal comprising a red-fluorescence signal; and
    wherein interpreting the second pressure of the second stressor based on the second reporter model and the second plant-reporter signal comprises interpreting the second pressure of the second stressor, comprising a nutrient deficiency, based on the second reporter model and the second plant-reporter signal comprising a green-fluorescence signal.

* * * * *

UNITED STATES PATENT AND TRADEMARK OFFICE
CERTIFICATE OF CORRECTION

PATENT NO. : 12,360,044 B2
APPLICATION NO. : 17/991199
DATED : July 15, 2025
INVENTOR(S) : Shely Aronov et al.

Page 1 of 1

It is certified that error appears in the above-identified patent and that said Letters Patent is hereby corrected as shown below:

In the Claims

Claim 4, Column 40, Line 42, "the second" should read --wherein the second--.

Signed and Sealed this
Second Day of September, 2025

Coke Morgan Stewart
*Acting Director of the United States Patent and Trademark Office*